US012605892B2

(12) United States Patent
Niederberger

(10) Patent No.: US 12,605,892 B2
(45) Date of Patent: Apr. 21, 2026

(54) CABLE ROBOT 3D PRINTER AND METHOD FOR DETECTING THE POSITION AND FOR CHANGING THE POSITION OF THE PRINT HEAD OF A CABLE ROBOT 3D PRINTER

(71) Applicant: Anton Niederberger, Oberdorf NW (CH)

(72) Inventor: Anton Niederberger, Oberdorf NW (CH)

( * ) Notice: Subject to any disclaimer, the term of this patent is extended or adjusted under 35 U.S.C. 154(b) by 687 days.

(21) Appl. No.: 17/285,114

(22) PCT Filed: Aug. 23, 2019

(86) PCT No.: PCT/EP2019/072653
§ 371 (c)(1),
(2) Date: Apr. 14, 2021

(87) PCT Pub. No.: WO2020/039098
PCT Pub. Date: Feb. 27, 2020

(65) Prior Publication Data
US 2021/0402689 A1 Dec. 30, 2021

(30) Foreign Application Priority Data
Aug. 23, 2018 (DE) .......................... 102018120662.3

(51) Int. Cl.
*B29C 64/241* (2017.01)
*B29C 64/209* (2017.01)
(Continued)

(52) U.S. Cl.
CPC .......... *B29C 64/241* (2017.08); *B29C 64/209* (2017.08); *B29C 64/321* (2017.08);
(Continued)

(58) Field of Classification Search
CPC ... B29C 64/241; B29C 64/321; B29C 64/386; B29C 64/209; B33Y 30/00; B33Y 50/00; B25J 9/0078; B25J 9/104
See application file for complete search history.

(56) References Cited

U.S. PATENT DOCUMENTS 559,441 A * 5/1896 Cook ........................ B28D 1/06
74/124
2,091,225 A * 8/1937 Eaton ....................... E21B 19/14
254/375
(Continued)

FOREIGN PATENT DOCUMENTS

DE      102014015335 A1    4/2016
WO        2017174201 A1    10/2017

OTHER PUBLICATIONS

Toru Makino et al.: "Cable collision avoidance of a pulley embedded cable-driven parallel robot by kinematic redundancy", Control, Mechatronics and Automation, ACM, 2 Penn Plaza, Suite 701, New York, NY, 10121-0701 USA, 7. Dec. 2016, pp. 117-120, XP058326676, DOI: 10.1145/3029610.3029620 ISBN: 978-1-4503-5213-0; paragraph [02.1]; Figs. 1-3.

*Primary Examiner* — Galen H Hauth
*Assistant Examiner* — John Robitaille
(74) *Attorney, Agent, or Firm* — GREENBLUM & BERNSTEIN, P.L.C.

(57) ABSTRACT

The task of the invention is to create a 3D printer to produce, for example, bone substitutes or organ substitutes or other objects such as prostheses from organically compatible materials
Cable robot 3D printer (1), comprising a cable robot (1) with eight cables (2) or straps (2), wherein the cables (2) or straps (2) are detachably attached at a first end (3) to a print head (4) and are guided from the print head (4) to a respective cable drum (5), and the other second end (6) of the cables (2) or straps (2), which is opposite the print head (4) in each case, can be wound in the cable drum (5) in a planar, crossing-free manner wherein the cable drums (5) are arranged within a working space (7) and wherein the cable drums (5) are drivable and the drives (8) of the cable drums (5) are arranged outside or inside the working space (7), and in that at least one material feed (9) and at least one nozzle (10) are provided on the print head (4).
Method for detecting the position and for changing the position of the print head (4) of a cable robot 3D printer (1), (Continued)

comprising a cable robot (1) with eight cables (2) or belts (2) which are guided from a print head (4) to a respective cable drum (5), characterized in that the cables (2) or straps (2) are wound in the cable drum (5) in a planar crossing-free manner and, for a control circuit for detecting the desired position, the respective cable lengths, which are detected via encoders on the drives (8), are determined as measured variables and the cable forces are determined as manipulated variables of the control circuit.

9 Claims, 19 Drawing Sheets

(51) Int. Cl.
    *B29C 64/321*        (2017.01)
    *B29C 64/386*        (2017.01)
    *B33Y 30/00*          (2015.01)
    *B33Y 50/00*          (2015.01)
    *B29C 64/106*        (2017.01)

(52) U.S. Cl.
    CPC ............ *B29C 64/386* (2017.08); *B33Y 30/00* (2014.12); *B33Y 50/00* (2014.12); *B29C 64/106* (2017.08)

(56)          References Cited

U.S. PATENT DOCUMENTS

| | | | |
|---|---|---|---|
| 6,735,820 B1 * | 5/2004 | Teutsch | E05F 1/00 |
| | | | 16/72 |
| 2009/0066100 A1 * | 3/2009 | Bosscher | B25J 17/0266 |
| | | | 901/30 |
| 2014/0331808 A1 * | 11/2014 | Reid | B25J 9/1045 |
| | | | 74/490.04 |

* cited by examiner

CABLE ROBOT 3D PRINTER AND METHOD FOR DETECTING THE POSITION AND FOR CHANGING THE POSITION OF THE PRINT HEAD OF A CABLE ROBOT 3D PRINTER

CROSS REFERENCE TO RELATED APPLICATIONS

This application is the U.S. national stage of International Application No. PCT/EP2019/072653, filed on 2019 Aug. 23. The international application claims the priority of DE 102018120662.3 filed on 2018 Aug. 23; all applications are incorporated by reference herein in their entirety.

BACKGROUND

Cable robot 3D printer and method for detecting the position and for changing the position of the print head of a cable robot 3D printer, in particular for printing sensitive objects, such as prostheses and for producing bone substitutes or for printing organic material or organs.

3D printing has been successfully used in the industry for some time in various areas. For example, geometrically demanding objects that previously had to be produced with high material consumption using shaping or subtractive tools can now be designed with the aid of computers and produced additively, i.e. with virtually no loss of material.

Until now, the first attempt has usually been to replace defects resulting from trauma or surgery with a so-called autograft, i.e. bone taken from other parts of the patient's skeleton. The production of bone replacement is very complicated and risky. The disadvantages of this procedure are obvious: On the one hand, humans have only a limited amount of bone material that can be used in this way, and on the other hand, the results are not always functionally exact or, as in the case of maxillofacial surgery, often cosmetically unsatisfactory.

For example, 3D printers and cable robots are already known which, on the one hand, divide the object to be produced into layers and, on the other hand, have complex cable reversals and thus longer cable lengths, which do not allow individual and precise 3D printing.

SUMMARY

The task of the invention is to create a 3D printer to produce, for example, bone substitutes or organ substitutes or other objects such as prostheses from organically compatible materials Cable robot 3D printer (1), comprising a cable robot (1) with eight cables (2) or straps (2), wherein the cables (2) or straps (2) are detachably attached at a first end (3) to a print head (4) and are guided from the print head (4) to a respective cable drum (5), and the other second end (6) of the cables (2) or straps (2), which is opposite the print head (4) in each case, can be wound in the cable drum (5) in a planar, crossing-free manner wherein the cable drums (5) are arranged within a working space (7) and wherein the cable drums (5) are drivable and the drives (8) of the cable drums (5) are arranged outside or inside the working space (7), and in that at least one material feed (9) and at least one nozzle (10) are provided on the print head (4).

Method for detecting the position and for changing the position of the print head (4) of a cable robot 3D printer (1), comprising a cable robot (1) with eight cables (2) or belts (2) which are guided from a print head (4) to a respective cable drum (5), characterized in that the cables (2) or straps (2) are wound in the cable drum (5) in a planar crossing-free manner and, for a control circuit for detecting the desired position, the respective cable lengths, which are detected via encoders on the drives (8), are determined as measured variables and the cable forces are determined as manipulated variables of the control circuit.

DETAILED DESCRIPTION

The task of the invention is to create a 3D printer to produce, for example, bone substitutes or organ substitutes or other objects such as prostheses from organically compatible materials.

The task is solved by a cable robot 3D printer with the features according to the claimed printer embodiments and by a method for position detection and position change of the print head of a cable robot 3D printer according to the claimed method embodiments. Further developments are given in respective dependent claims.

The invention achieves in the indicated application that a cable robot 3D printer is created, which comprises a cable robot with eight cables or straps and the cables or straps are attached at a first end to a print head or to a constructive component on or for the print head and are led from the print head or this constructive component to a respective cable drum and the other second end of the cables or straps opposite the print head in each case can be wound in the cable drum in a planar crossing-free manner, wherein the cable drums are arranged within a working space and wherein the cable drums can be driven by means of drives, and in that at least one material supply and at least one nozzle are provided for or on the print head, whereby sensitive objects such as, for example, prostheses or bone replacements or bone replications or organic material or organs can be printed.

The attachment of the first end of the cables or straps to the print head or structural component may be detachable, which is advantageous for maintenance or repair purposes, for example This cable robot 3D printer is capable of producing millimeter-precise or high-precision bone replications from organic material for organic material, for example. With the eight cables on which the print head is suspended, the print head can be moved and swiveled freely and with high precision in six axes in the working area. The eight cables are all controlled separately by one geared motor each.

The printing process is genuine, i.e original or following the original three-dimensionally, unlike the systems currently available on the market, in which the object to be produced is divided into layers and then materialized layer by layer. For example, an individual computer tomographic scan directly from the patient serves as a template for the bone part to be replicated. The print head can also be positioned at an angle and rotated.

The cable robot 3D printer can be used to produce complicated geometries tailored to the patient without loss of material and without the need for a mold. The material is synthesized as a porous structure in the printing process. As with bones, for example, a so-called sponge-like appearing structure or a net-like bone beam structure is reproduced or printed. After a transplant, the surrounding tissue now connects with the artificial bone. In the process, the interstices of the porous tissue are penetrated by blood vessels and filled with cells, so that after the organic plastic or material, such as natural calcium, has been broken down or accepted, the body's own bone can form. It is obvious that the natural calcium may contain an appropriate binder, if this becomes necessary, to maintain the stability and structure that may be required.

The printed organic material eliminates the need to remove the body's own bone material, as was previously the case. Possible rejection reactions of the body to the implanted foreign bodies are also largely avoided.

Titanium rods can be incorporated during printing to reinforce the structure to be printed so that the bone substitute or bone replication can be subjected to full loads immediately after insertion or the bone substitute or bone replication can be subjected to full loads in highly stressed areas. At least one mechanical gripping device is provided on the print head for this purpose. Other aids may also be provided.

If necessary, a milling tool removes the interfering surface structure of the 3D print. This ensures that the print object, i.e. the bone substitute or bone replica, has the smooth shape of the respective digital template. Furthermore, if required, the corresponding milling tool can be used to subsequently machine holes, grooves, etc. in the finished surface structure of the 3D printed object, so that the printed object already has the necessary connections for a later screw connection or assembly of a joint.

To ensure a smooth workflow within the surgical department, once a printing process has been completed, the system can be easily disassembled, unlike conventional 3D printers that work with significantly more mechanical parts, and sterilized together with the rest of the surgical equipment in the disinfection facilities already existing in the surgical departments, so that a completely germ-free apparatus is available for the next printing process.

The print object is created in a completely enclosed workspace. The working area can be separated or closed off accordingly and is sterile. This prevents environmental influences such as dust, dirt and bacteria. This can be set under vacuum, overpressure and or inert gas atmosphere to avoid reactions of the organic material with the ambient air. In addition, the workspace can be heated. The printing process can be observed through viewing windows.

The 3D printer for organic materials uses the principle of the cable robot for positioning the print head, using eight cables or straps to position and load the manipulator in all six degrees of freedom. Up to two additional rotational axes can be mounted on the print head if the mobility in the rotational degrees of freedom, i.e. the degrees of freedom of rotation by the cable robot alone, is not sufficient.

The working space is cube-shaped or cuboid. The cable drums are arranged in the area of the corners of the cube-shaped or cuboid working chamber. Accordingly, due to the positions of the cable exits as cable exit points of the cable drums, the cable drums as well as the working space form a cuboid or a cube, respectively the spatial dimensions of a cuboid or a cube.

Cable drums can be mounted in the floor as well as in the ceiling of the working area in the area of the corners. Likewise, the respective cable drums can be mounted in or on the side walls of the workspace in the area of the corners. Mixed forms are also possible.

The print head or its frame comprises eight spherical cable or strap suspensions, a nozzle and a valve. A pump is used to convey the liquid or viscous polymer or material to be printed to the print head for 3D printing and meter it. The print material is fed to the print head by a flexible spiral hose or a container on the print head is filled directly with the print material. The energy supply is also provided by a spiral cable or along the material supply or there is a rechargeable battery on the print head. The signal transmission also takes place via spiral cable or via radio.

The print head is arranged on or in an inherently flat or planar square or rectangular or circular frame or an inherently spatial cube-shaped frame or direct wire link frame or a tetrahedron-shaped frame.

The print head and frame can also be designed as one component or a combined component.

The first end of the respective cables or straps is attached to the frame in a floating or mobile manner with a cable attachment or strap attachment. The fastening can also be designed to be detachable, for example for maintenance purposes.

The cable attachment or strap attachment corresponds to the cable end point on the frame or on the print head or is equated to this in the consideration.

The positions of the attachments of the cables or straps as cable attachments or strap attachments to the print head are arranged on the frame shown above, which surrounds the print head at least at its edges or supports it. Accordingly, one or two of the first ends of the one or more cables or straps are joined at a point. In all variants of the frame, the points of cable attachment or strap attachment to the print head can be parallel or rotated 45 degrees with respect to the working space in the neutral position. Several or different cable arrangements can be considered for the different variants.

Accordingly, a cable or strap is guided from the respective cable drums at the top and bottom, each individually or in pairs, to a corner of the frame.

Alternatively, the cables or straps are guided from respective corners adjacent to the cable drums of a side surface bounding the working space or of an edge at the bottom or at the top, from the corners diagonally opposite one of the side surfaces bounding the working space, from the corners diagonally opposite one another in the working space, in each case individually or in pairs to a corner of the frame or print head and/or in each case individually or in pairs to adjacent or diagonally opposite corners of the frame or print head.

This allows the forces to be absorbed as a reaction in all three translational axes and the associated rotational axes. If the cables or straps cross in all three global axes, this results in greater stability. The balance of power improves because of the larger lever. The length of the lever is greater by the height of the print head or its frame.

Within the working area or printing area, the respective cable drums are located in the corners. The cable is wound planar in the respective cable drum, i.e. perpendicular to the rotation axis of the cable drum, so that the cable does not cross over during winding in or on the cable drum. Thus, the respective cable length is always clearly defined via the cable rotation and the respective cable force via the respective torque. The respective cable drum is in two parts and can thus be dismantled very easily for sterilization.

Irrespective of this, the cable drums have external teeth on the outer circumference. The external toothing of the cable drums engages in a worm shaft for the drive in each case, whereby the respective drive directly or indirectly drives the respective worm shaft. The worm shaft can also be a hollow shaft.

Furthermore, the respective cable drums can be swiveled around the worm shaft and thus follow the movements and directions of the cables or straps without tension, which result from the different positions of the print head and thus from the different cable or strap lengths and cable or strap directions. It also allows the print head to reach all corners of the work area. The swiveling movement of the cable drum is not driven, but is aligned with the print head by the cable tension itself.

For hygienic reasons, the eight respective drives of the worm shaft are located outside the working area for each application. The torque is transmitted to the working chamber via a shaft or via a contactless magnetic coupling. Depending on the type of drive, the respective worm shaft is thus guided through a seal from the working chamber to the drive or is coupled or operatively connected to the drive by means of a coupling. In the first case, the working space at the entry point of the rotating shaft is sealed, for example, with a rotary shaft seal. In the case of no or less strict hygienic requirements, the drives can also be arranged inside the working chamber and coupled or operatively connected to the worm shaft.

The control loop has the task of tracking the target position of the print head, which is interpolated from the programmed specifications (G-code), i.e. the x, y and z coordinates, and which changes constantly, as accurately as possible. The control loop contains the digital function blocks geometry model, cable force control, position detection, position control, linearization as well as an adaptive LQ controller, also known as linear-quadratic controller.

For at least position determination or position control or for error minimization, a defined standard cuboid of the highest surface quality and dimensional accuracy is first placed in the working space and all possible coordinates or points, in particular the contour or surface of the cuboid as well as the extreme or boundary coordinates of the working space, are scanned (probed) or read in several times or several passes as adaptive scanning. Any number of points can be measured with high precision. The measurement series with their deviations are recorded taking into account all influencing factors such as the individual cable characteristics. Any deviations that occur are compensated or corrected. Through the repetitions, the system learns to independently compensate for or correct any deviations that occur, since measurement and correction are carried out alternately on a continuous basis.

Furthermore, the working area is measured continuously in an independent measurement. The resulting results of the measurement series are averaged. This means that the influence of part or component characteristics can be recorded and taken into account at any time.

The respective measurement results can now be combined for high-precision positioning, so that precise control can be achieved in any position despite existing dependencies on parts or components.

There are areas that require less computing power or performance for position determination or position control than other areas in the workspace.

The measured variables for the control loop are the eight cable lengths, which are determined via encoders on the drives. In addition, an inertial system consisting of acceleration sensors and gyroscopes, a two-axis gravity pendulum, signal transmitters, preferably on the print head or the frame for runtime measurement, or digital cameras, which are arranged statically, can be used to increase the measurement accuracy. The manipulated variables of the control loop are the cable forces or the torques of the eight cable drums.

Advantageously, the blocks for the linearization and the LQ controller can be clocked approximately by a factor of 10 slower, which can reduce the necessary computing power and thus make the hardware simpler and less expensive, at least for this area.

The geometry model calculates the cable vectors from the end of the cable at the print head to the cable exit point at the cable drum from the target position and target angle of the print head. The cable lengths can be derived directly from these.

The respective products of normalized cable vectors and cable forces result in the vectorial forces on the print head generated by the respective cables. The cross product of the respective cable end points, i.e. the cable attachment or the strap attachment and the respective cable forces results in the vectorial torques on the print head generated by the cables.

The input matrix of all cable forces in a pressure position has one column with 6 rows for each of the 8 cables. Each column contains the normalized cable vector in the upper three rows and the cross product of the cable end points and the normalized cable vector of the respective cable in the lower three rows. Matrix multiplication of the input matrix with all the cable forces thus gives the total force generated by the cables and the total moment on the print head.

The cable force control calculates the ideal cable forces from the input matrix in order to keep the print head in equilibrium at this position. For this purpose, the linear system of equations of the eighth-order forces is reduced to a solvable sixth-order system by fixing the two lowest cable forces to the fixed minimum prestressing force. In order to reduce the computational load, this calculation can be carried out upstream and the cable forces can either be entered in the G-code to match the motion sequence or stored in a multi-dimensional table as a function of the print head position and interpolated at runtime.

The position determination determines the position error of the print head from the mentioned measured variables. Linearization of the geometry relations shows that the transposed negative input matrix multiplied by the displacement of the print head in all six degrees of freedom gives exactly the cable length difference. Reversing this equation shows that the position error can be determined by the negative transposed pseudo inverse of the input matrix multiplied by the measurement errors. By applying the Moore-Penrose pseudoinverse, the algorithm is guaranteed to return the position that most accurately matches the measured cable lengths.

The algorithm can advantageously be further extended to take into account cable elongations. This is then calculated using Hooke's law and the total cable length.

The position control calculates the necessary cable force corrections from the position error. The controller is a PID state controller with manipulated variable limitation and anti-windup. The real cable forces which the drives are to generate result from the sum of the ideal cable forces and the cable force corrections.

The linearization calculates the system matrix. This tells for the current print head position how the equilibrium changes when the cable vectors change due to a slight shift in the position of the print head. This matrix describes the inherent dynamics of the system and is decisive for the stability and for the control.

The adaptive LQ controller specifies the controller setting for the position control. The LQ method provides the controller settings with optimum settling time from the linearization matrix mentioned above. The system matrix A and the input matrix B are known from the previous blocks.

In order to reduce the computational load, the calculation of the linearization and the LQ controller can either be carried out at a lower frequency and/or upstream and the controller setting can either be provided in the G-code to match the motion sequence or stored in a multi-dimensional table as a function of the print head position and interpolated at runtime.

BRIEF DESCRIPTION OF THE DRAWINGS

Several examples of the invention are shown in the drawings and are described in more detail below. The following is shown.

DETAILED DESCRIPTION OF THE PREFERRED EMBODIMENTS

Figure 1:
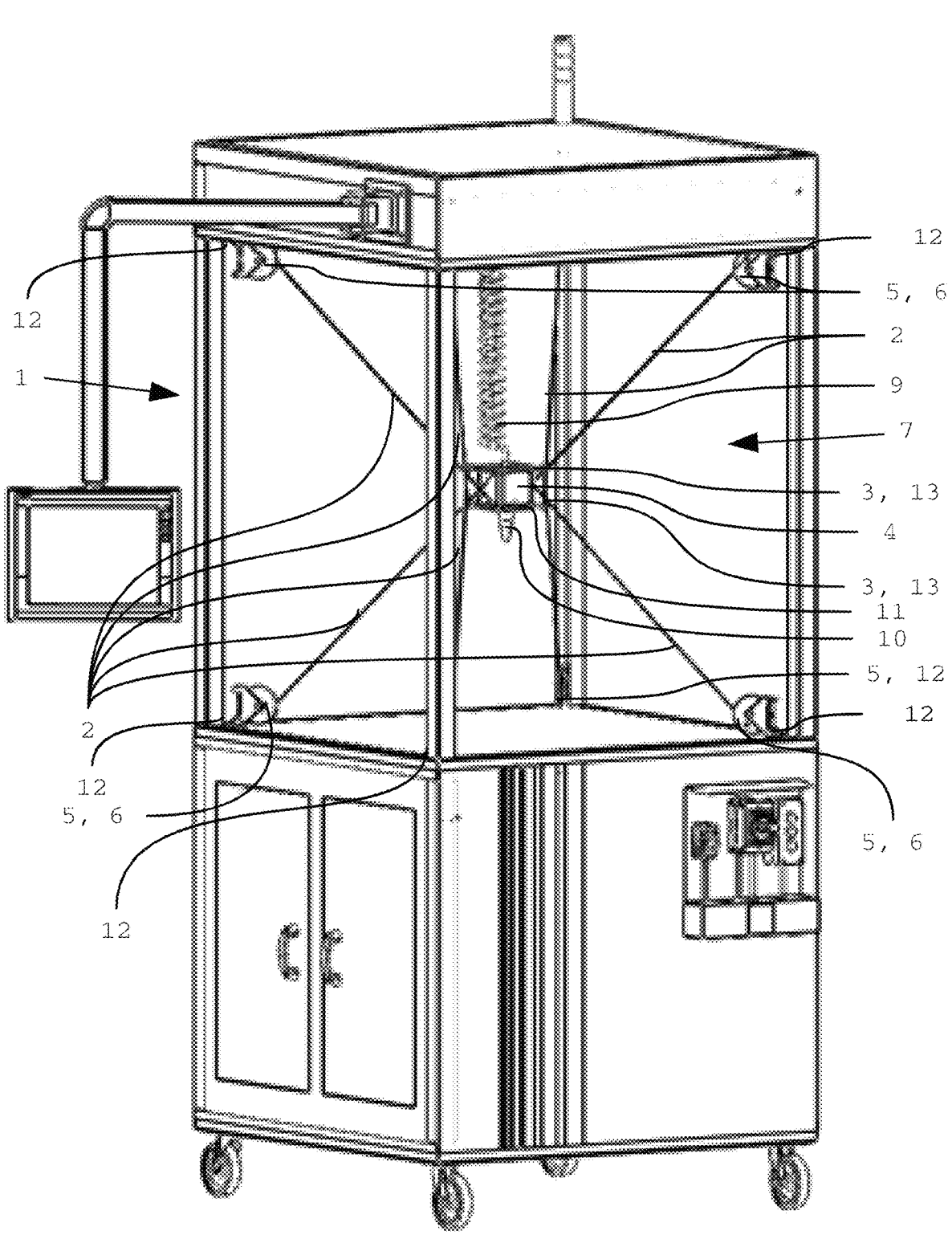
FIG. 1 A cable robot 3D printer in a housing with drives of the cable drums located outside the printing chamber, FIG. 2 A cable robot 3D printer in a housing with drives of the cable drums arranged inside the printing chamber, FIGS. 3 to 15 Schematic representations of a cable robot 3D printer with different cable guides and print heads or frames for print heads, FIG. 16A and 16B Detailed illustration of a print head with frame and with cables of a cable robot 3D printer, FIG. 17 a detailed view of a worm shaft in the workspace of a cable robot 3D printer, FIGS. 18 and 19 Detailed views of a cable drum, worm shaft in the workspace of a cable robot 3D printer, FIGS. 20 to 22 Detailed views of a cable drum from different perspectives, FIG. 23 A schematic detail view of a feedthrough with sealing of a worm shaft into the working space of a cable robot 3D printer.
Figure 2:
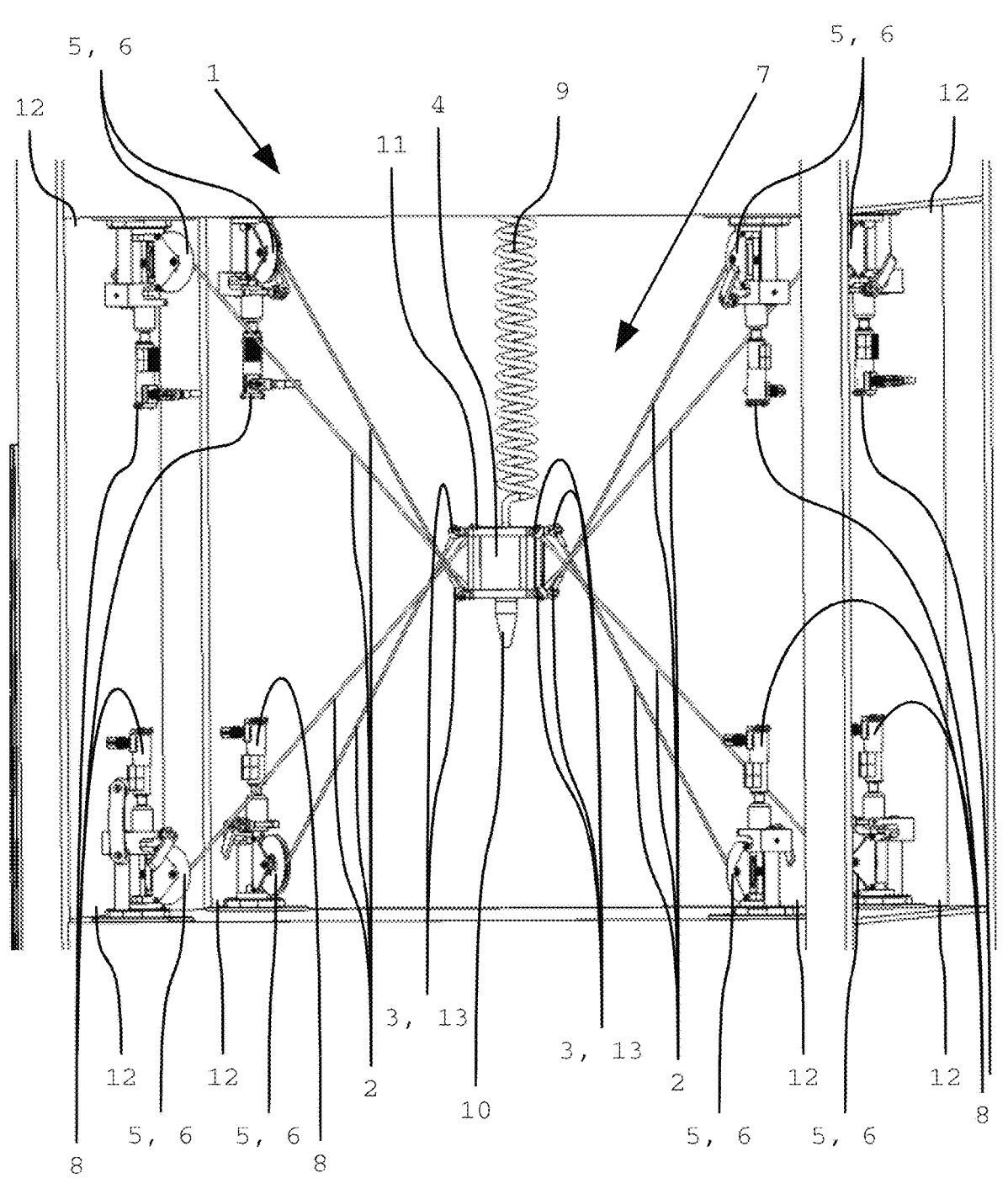

As shown in FIGS. 1 to 15, the cable robot 3D printer 1 according to the invention comprises eight cables 2, which may also be in the form of straps 2 or may be substituted for straps 2. As shown in detail in FIGS. 16a and 16b, the cables 2 or straps 2 are attached in a floating and detachable manner at a first end 3 to a frame 11 as a structural component of the print head 4. From the print head 4, the cables 2 or straps 2 are each led to a cable drum 5. These other second ends 6 of the cables 2 or straps 2, respectively opposite from the print head 4, can be wound in the cable drum 5 in a planar crossing-free manner. As shown in FIGS. 1 and 2, the cable drums 5 are arranged within a working space 7 on the floor as well as on the ceiling of the working space 7. The cable drums 5 can be driven by drives 8. Depending on the intended use of the cable robot 3D printer 1, the drives 8 of the cable drums 5 are arranged outside the working area 7, as shown in FIG. 1. FIG. 2 shows that the actuators 8 are inside the working space 7. Further, as shown in FIGS. 1 and 2 and 16a and 16b, at least one material supply 9 and at least one nozzle 10 are provided on the print head 4. FIG. 16b also shows that a gripping device 16 is also provided on the print head 4.

As shown in FIGS. 1 and 2 and 3 to 15, the working space 7 is cuboidal. Cube-shaped workspaces are also possible. Other shapes or spatial expansions of the working spaces 7 are not excluded, taking into account the appropriate cable guidance of the cables 2 or straps 2 and the positions of the print head 4 or nozzle 10 to be reached.

Depending on the hygiene requirements, the working area 7 can be separated from the environment or can be closed or sterile. As shown in FIGS. 1 and 2, the cable robot 3D printer 1 is housed in a cabinet that is preferably mobile for increased flexibility. The working chamber 7 is cuboidal in this case, but can also be cube-shaped.

Figure 16A:
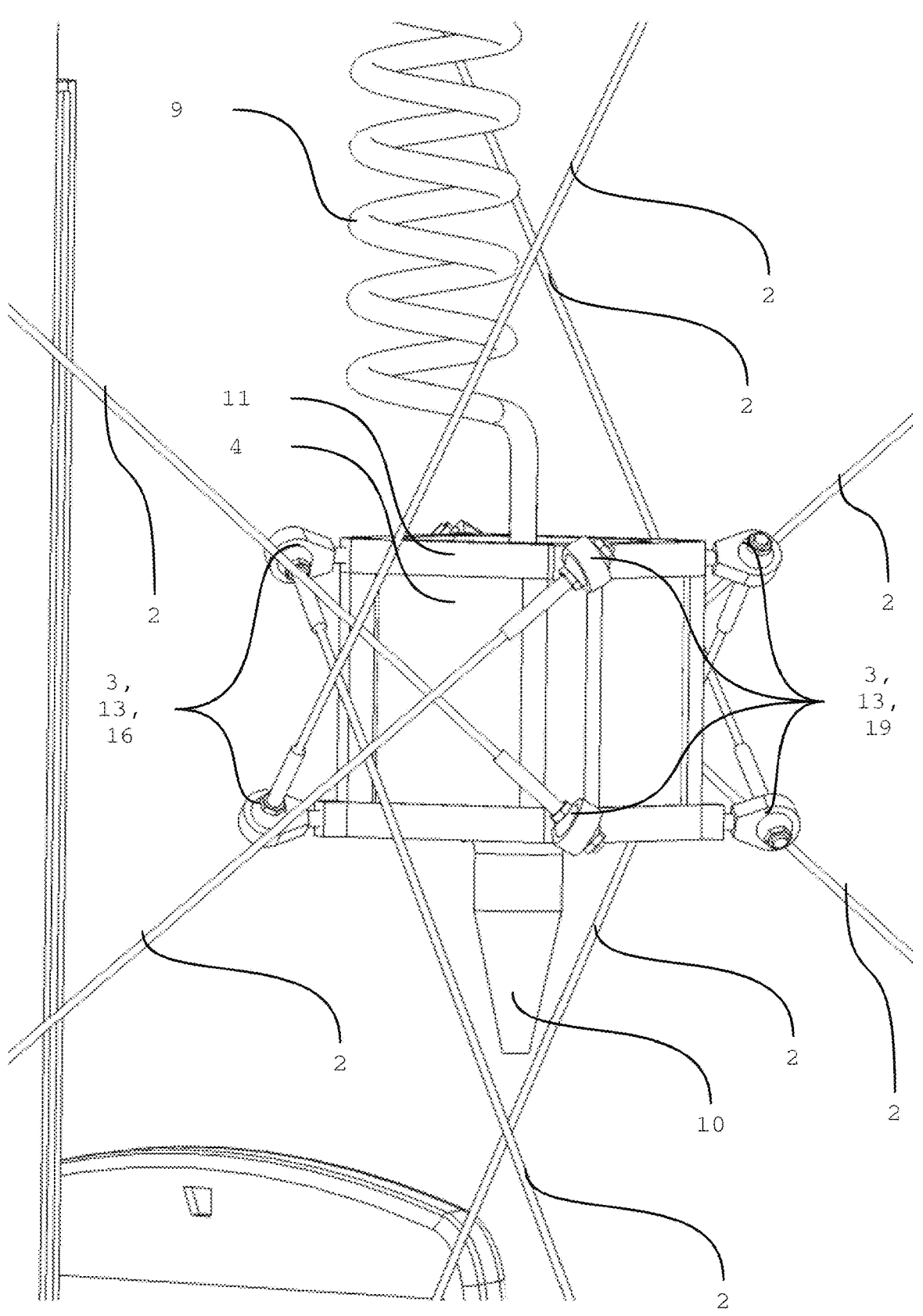

FIGS. 16a and 16b show that a frame 11 is arranged around the print head 4.

Figure 11:
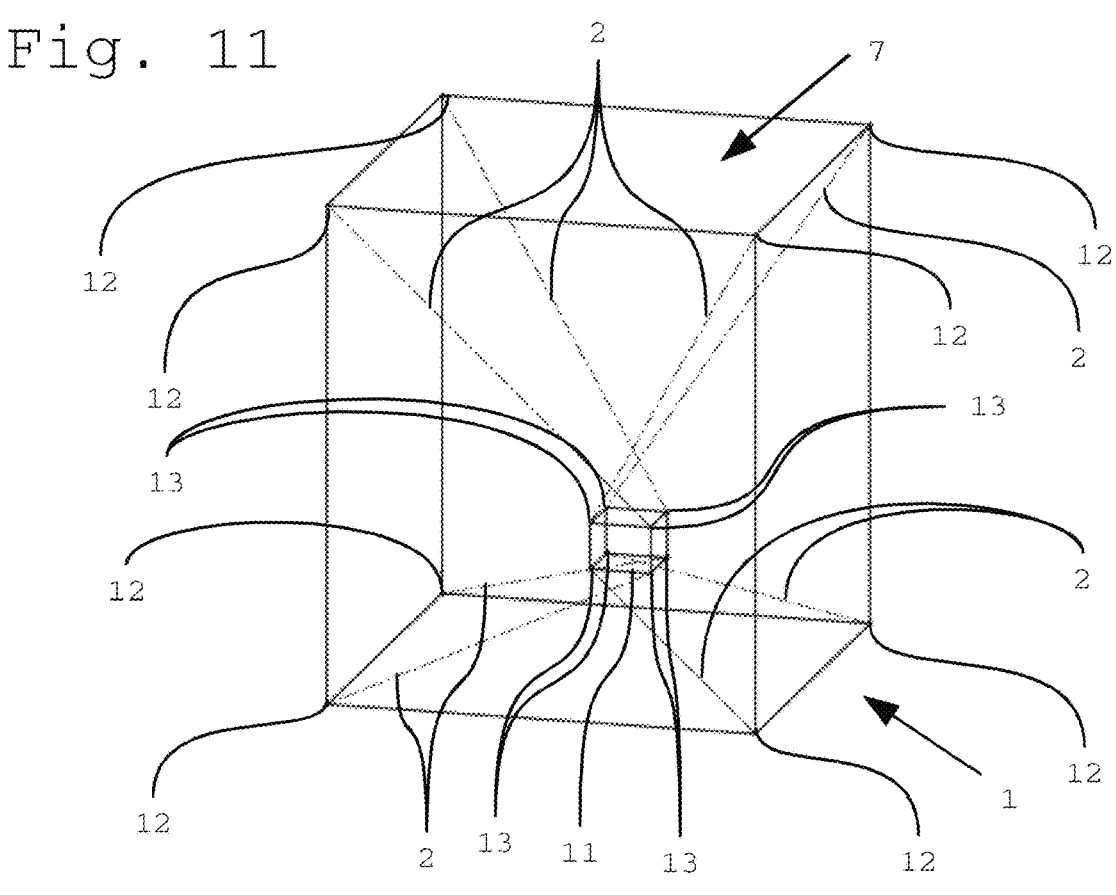
Figure 12:
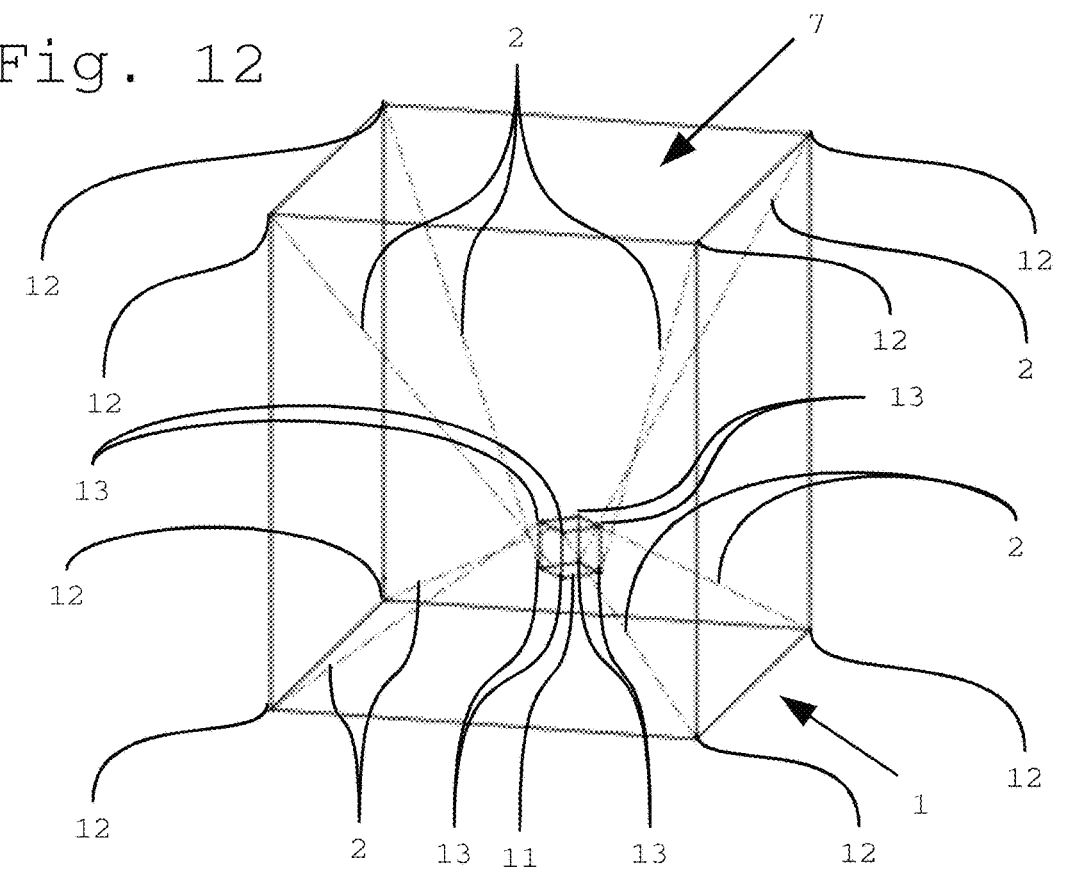
Figure 13:
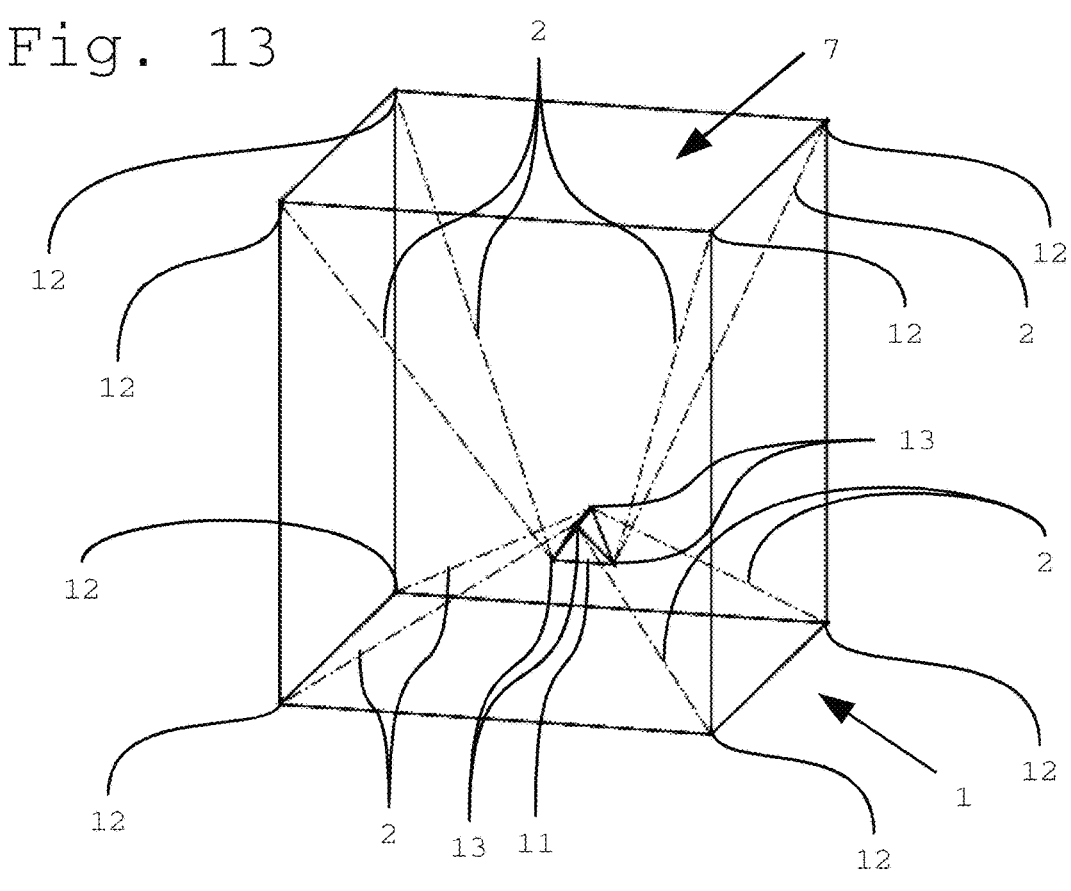
Figure 14:
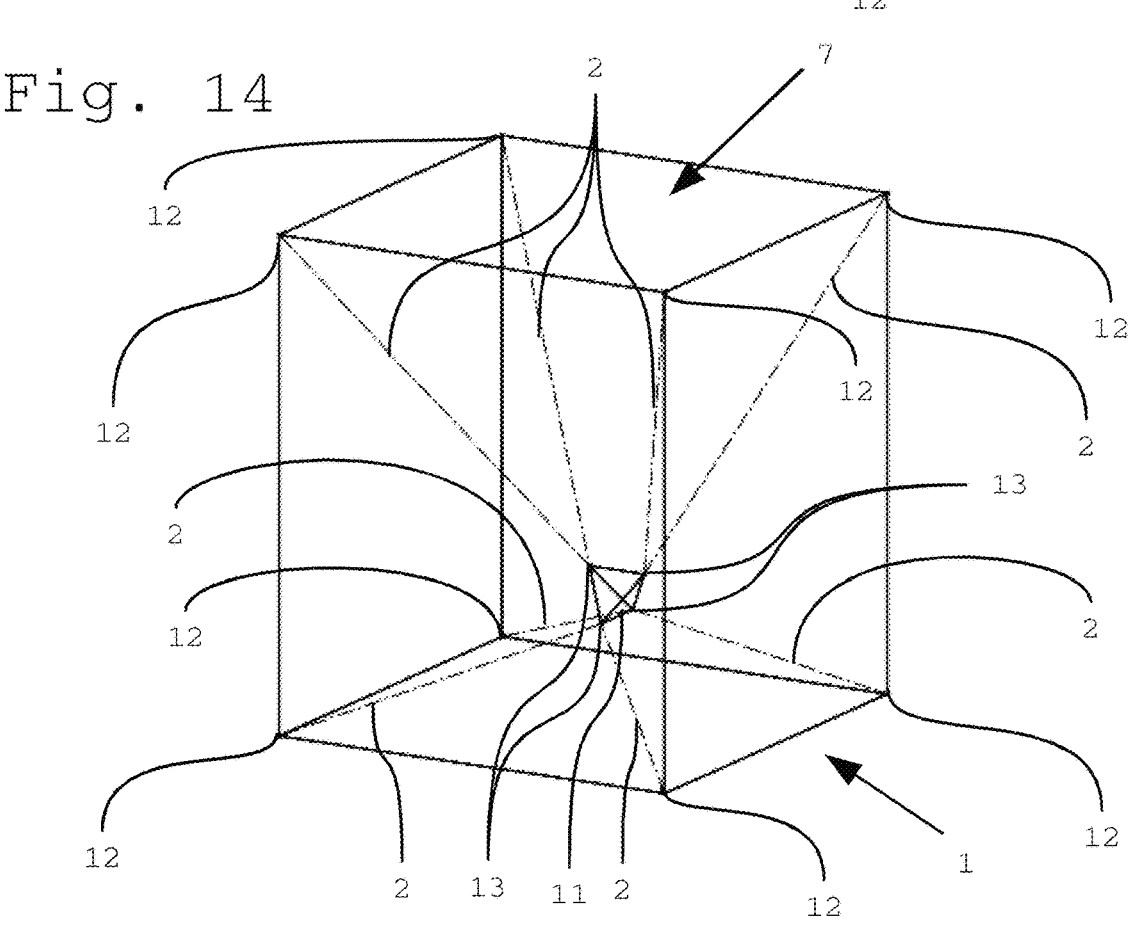
Figure 15:
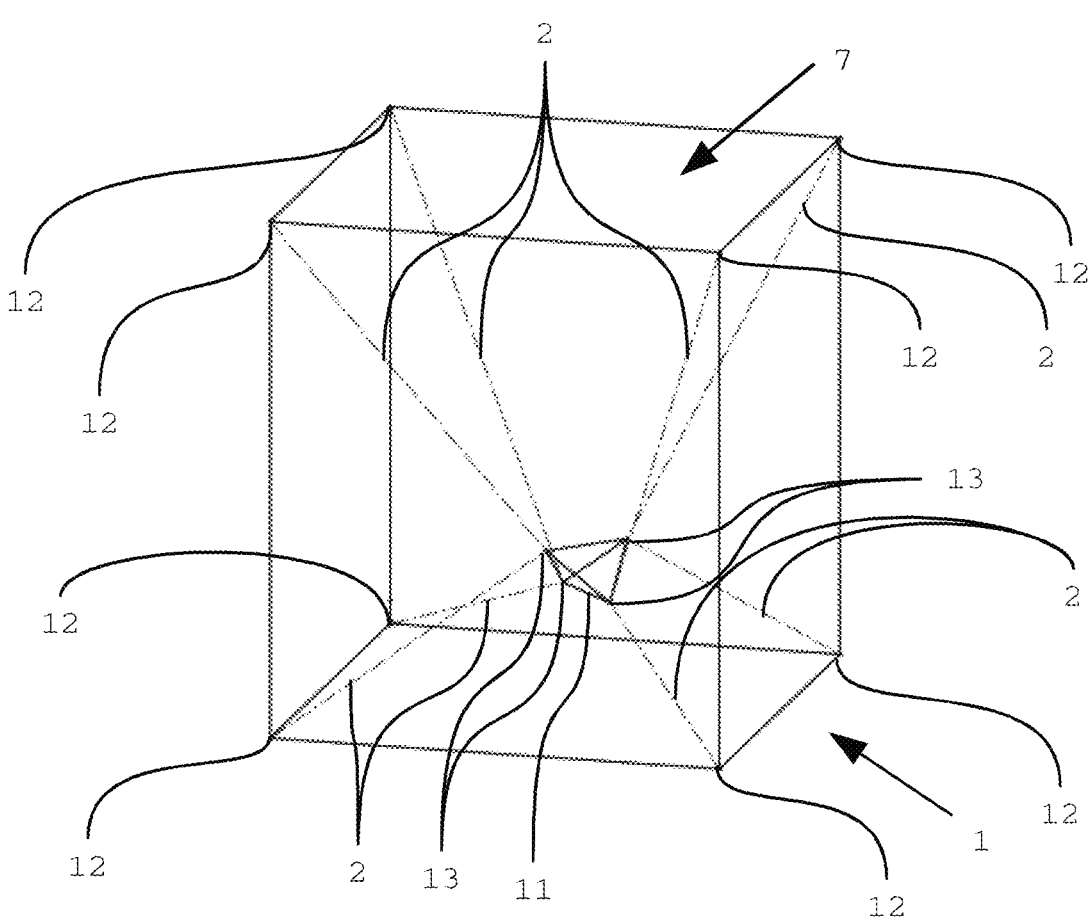
Figure 16B:
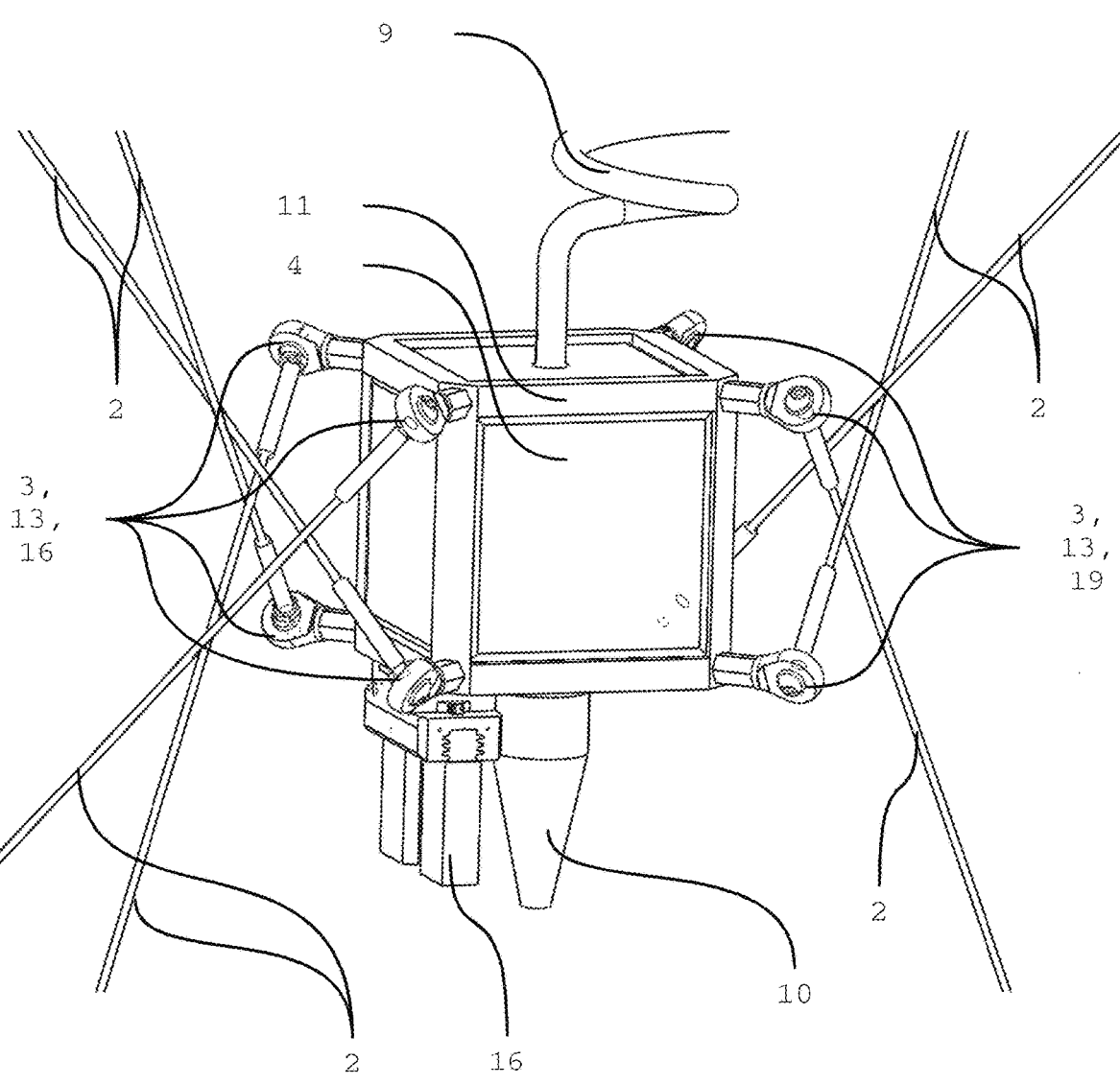
Figure 17:
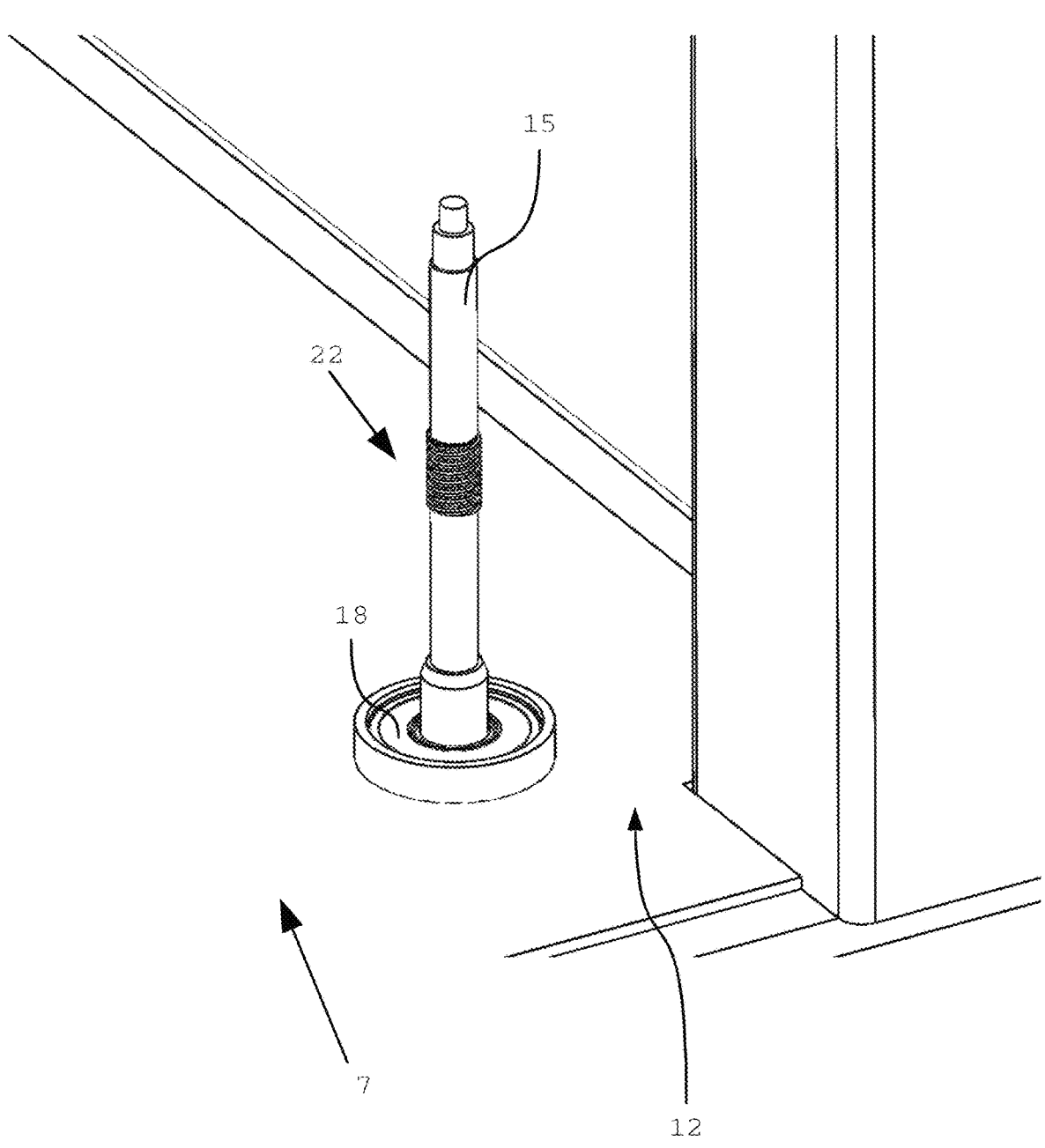

In addition to the shape as a cube-shaped frame 11 shown in FIGS. 16a and 16b as well as in FIGS. 7 to 12, which is adapted to the print head 4, the frame 11 may also be a cuboid shape (not shown) or, as in FIGS. 13 to 15, a tetrahedron shape or, as in FIGS. 3 to 6, flat as a square or as a rectangle (not shown) or round (not shown) or oval (not shown).

The print head 4 may be arranged on or in the respective frame 11. The respective first end 3 of the respective cables 2 or straps 2 is attached in a floating or detachable manner to the frame 11, as shown in FIGS. 16a and 16b, so that, depending on their position, the tensioned cables 2 or straps 2 can align themselves with respect to the frame 11 or printhead 4 without tension or can follow the movement and change in position of the printhead 4 or frame 111.

Figures 18, 19:
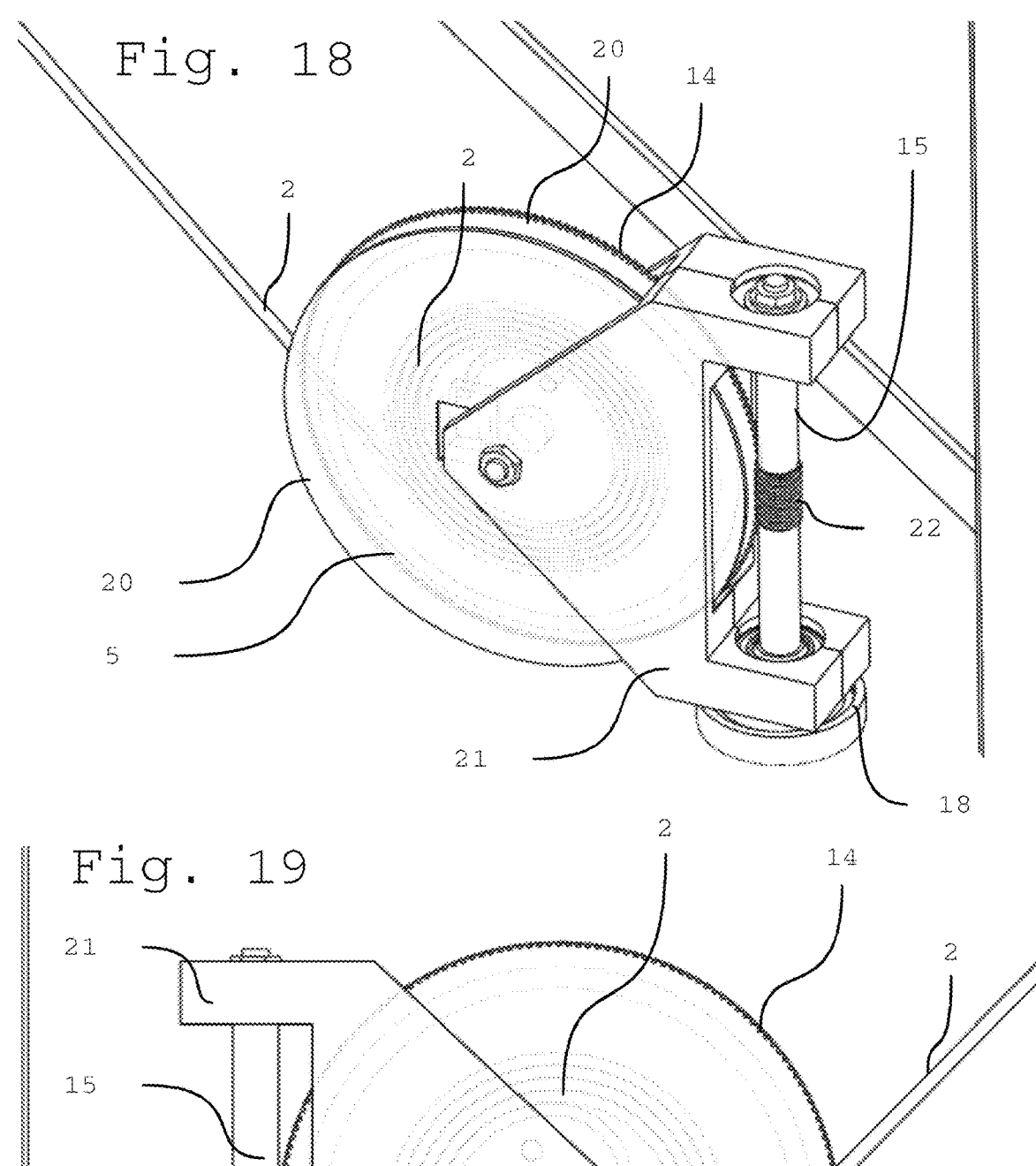
Figures 20, 21, 22:
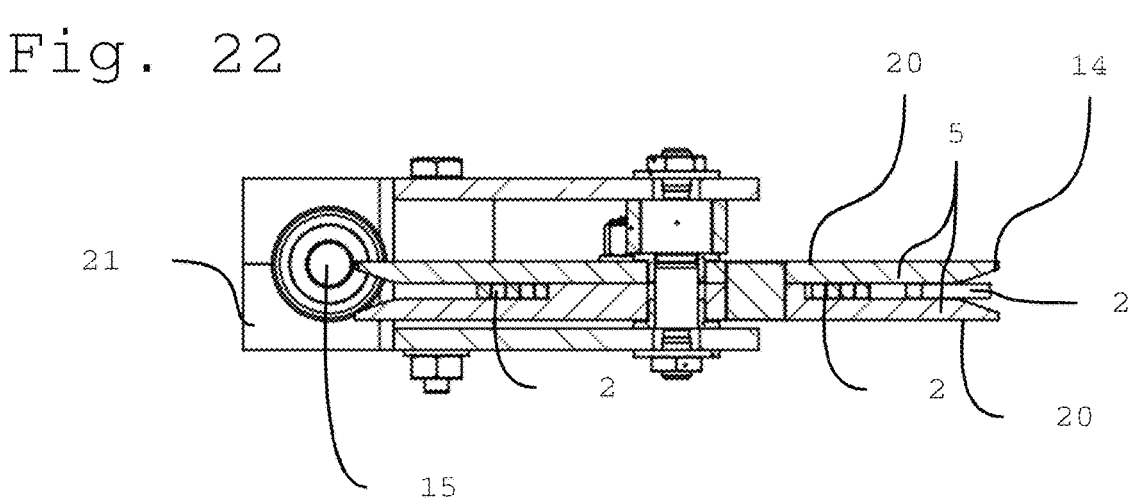

As shown in FIGS. 1 and 2, the cable drums 5 are arranged in the area of the corners 12 of the cube-shaped or cuboid working space 7. As shown in FIGS. 18 to 21, the cable drums 5 have external teeth 14 on at least one of the roller side sheaves 20 forming the cable drums 5. The external teeth 14 of the cable drum 5 or the pulley side disc 20 engage with a worm shaft 15. The cable drum 5 is pivotable about the worm shaft 15 in a mounting 21 which surrounds the worm shaft 15, as shown in FIGS. 18, 19 and 21.

Figures 23, 24:
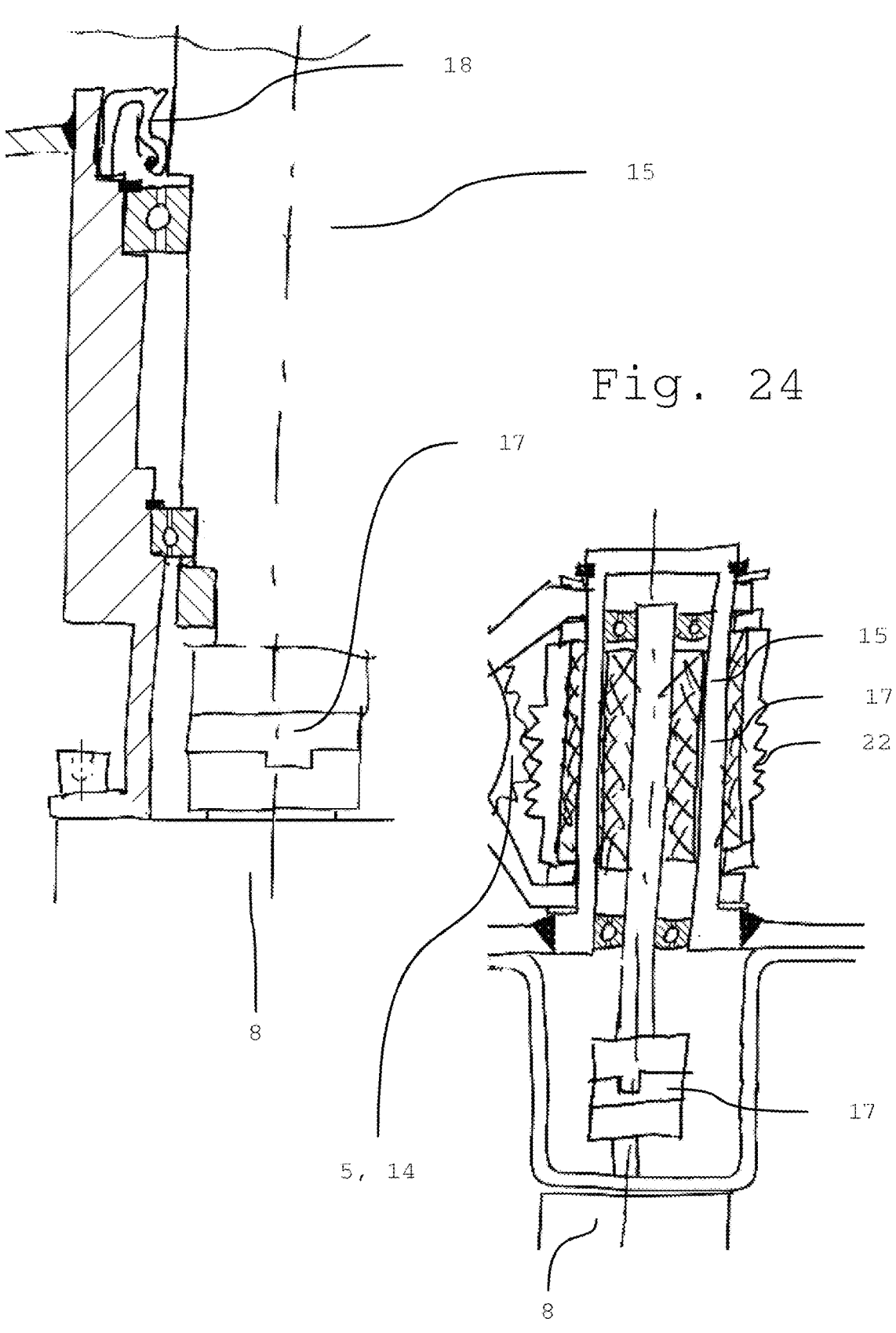
FIG. 24 A schematic detailed view of a magnetic coupling on a worm shaft in the workspace of a cable robot 3D printer, FIG. 25 A schematic detail view of a worm shaft with drive outside the working chamber and with a lead-through into the working chamber with seal, FIG. 27 A diagram of the cable force curve of the cables of the cable robot 3D printer, FIG. 28 A block diagram for the control circuit of the cable robot 3D printer and FIG. 29 A block diagram for the overall scheme of the control loop.
Figures 25, 26:
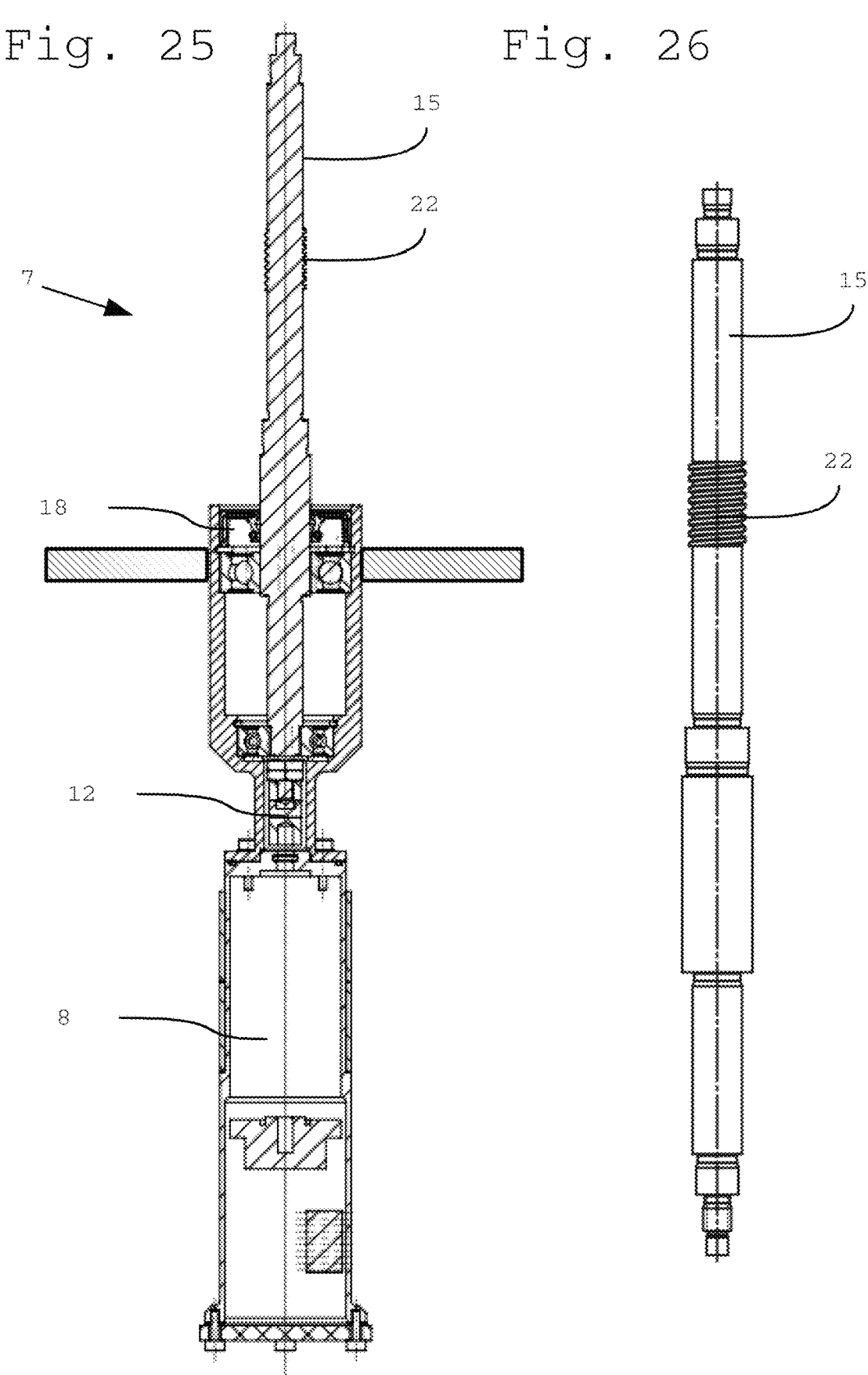

The drive 8 drives the worm shaft 15 directly via a mechanical coupling, as shown in FIGS. 23 and 25, or indirectly via a magnetic coupling, as shown in FIG. 24. If the drive 8 is outside the working chamber 7, the worm shaft 15 is guided through a seal from the working chamber 7 to the drive 8 and coupled to the drive 8 by means of a coupling 17.

Alternatively, as shown in FIG. 2, the drive 8 is arranged within the working chamber 7 and is coupled or operatively connected to the worm shaft 15.

In particular, the worm shaft 15 has an area with a helical worm 22 in the area of the cable drum 5 or the engagement of the external teeth 14 of the pulley side discs 20 of the cable drum 5, as shown in FIGS. 18, 19, 25 and 26.

The print head 4, or components of the print head 4, are configured to rotate in one of two or more axes. (not shown)

As shown in FIGS. 3 to 15, different variants of cables guides in the working space 7 are illustrated, in each of which a cable 2 or strap 2 is guided from the respective cable drums 5 at the top and bottom, in each case individually or in pairs, to a corner 13 of the frame 11. For the sake of simplicity, only the cables 2 will be referred to in the following, the associated cable drums 5 being understood to be present and included in each case, and the description also applying to straps 2 insofar as these are used or preferred instead of cables 2. It is irrelevant for the following consideration where and how exactly the cable drums 5 are mounted, what is important is their arrangement in the area of the corners 12 of the working space 7.

The respective workspace 7 has four side walls, each with four corners 12, and vertical and horizontal edges between each two corners 12. The horizontal edges are correspondingly present at the top or bottom as well as vertically between two side walls. By nature, two adjacent side walls share a vertical edge and two corners 12, namely a top corner and a bottom corner 12 with respect to the vertical edge common to the two adjacent side walls. In the following, reference is made only in simplified form.

Figures 3, 4:
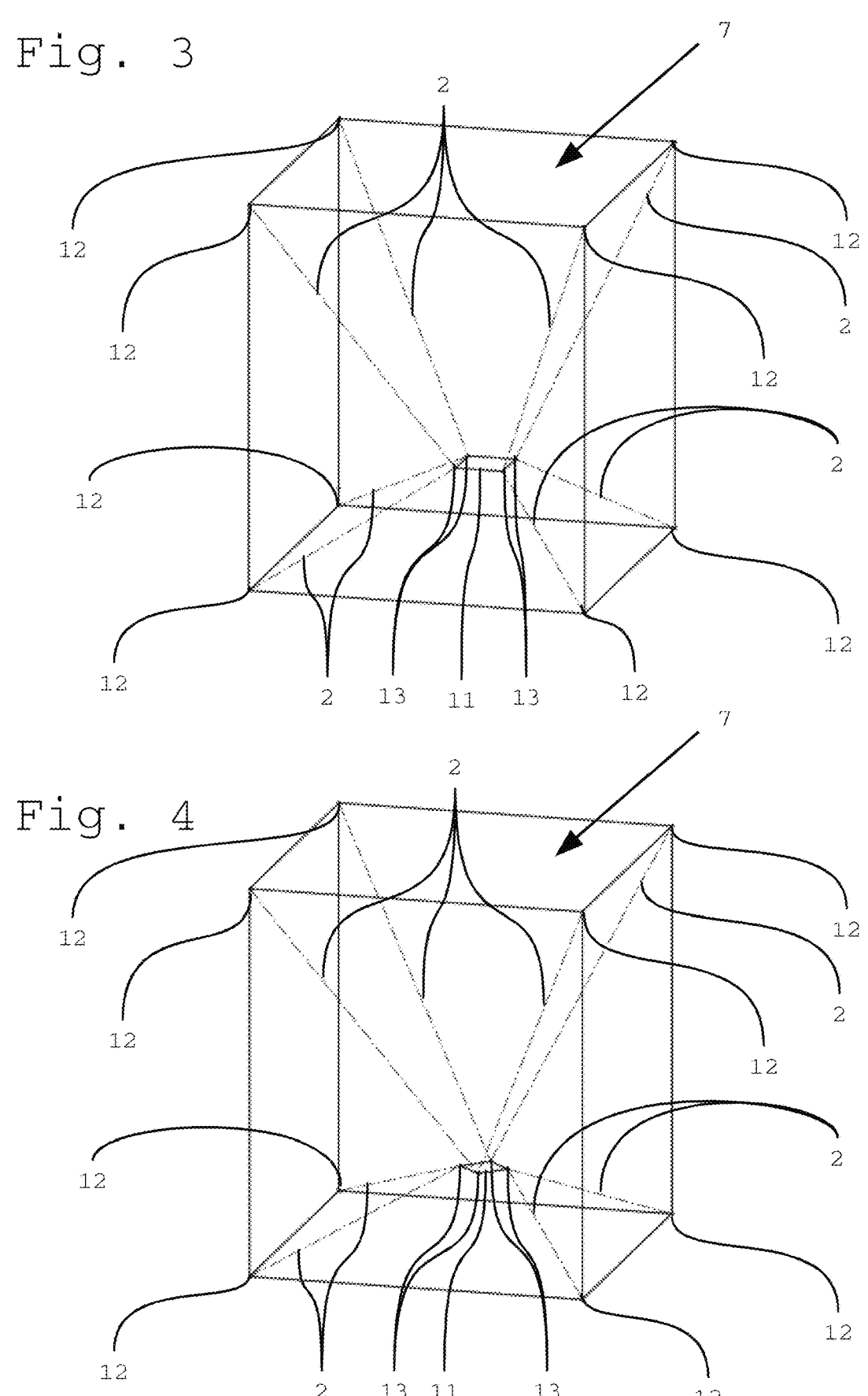

Thus, in FIG. 3, the cables 2 are guided together from two adjacent corners 12 of one of the vertical edges to the corner 13 of the flat square frame 11 nearest to the edge.

Thus, in FIG. 4, the cables 2 from two adjacent corners 12 of one of the horizontal edges are jointly guided to a corner 13 of the flat square frame 11, the affected edges of the working space 7 being parallel to each other at the bottom and at the top, respectively, but the affected edges of the working space 7 at the top and offset by 90 degrees with respect to the affected edges at the bottom of the working space 7.

Figures 5, 6:
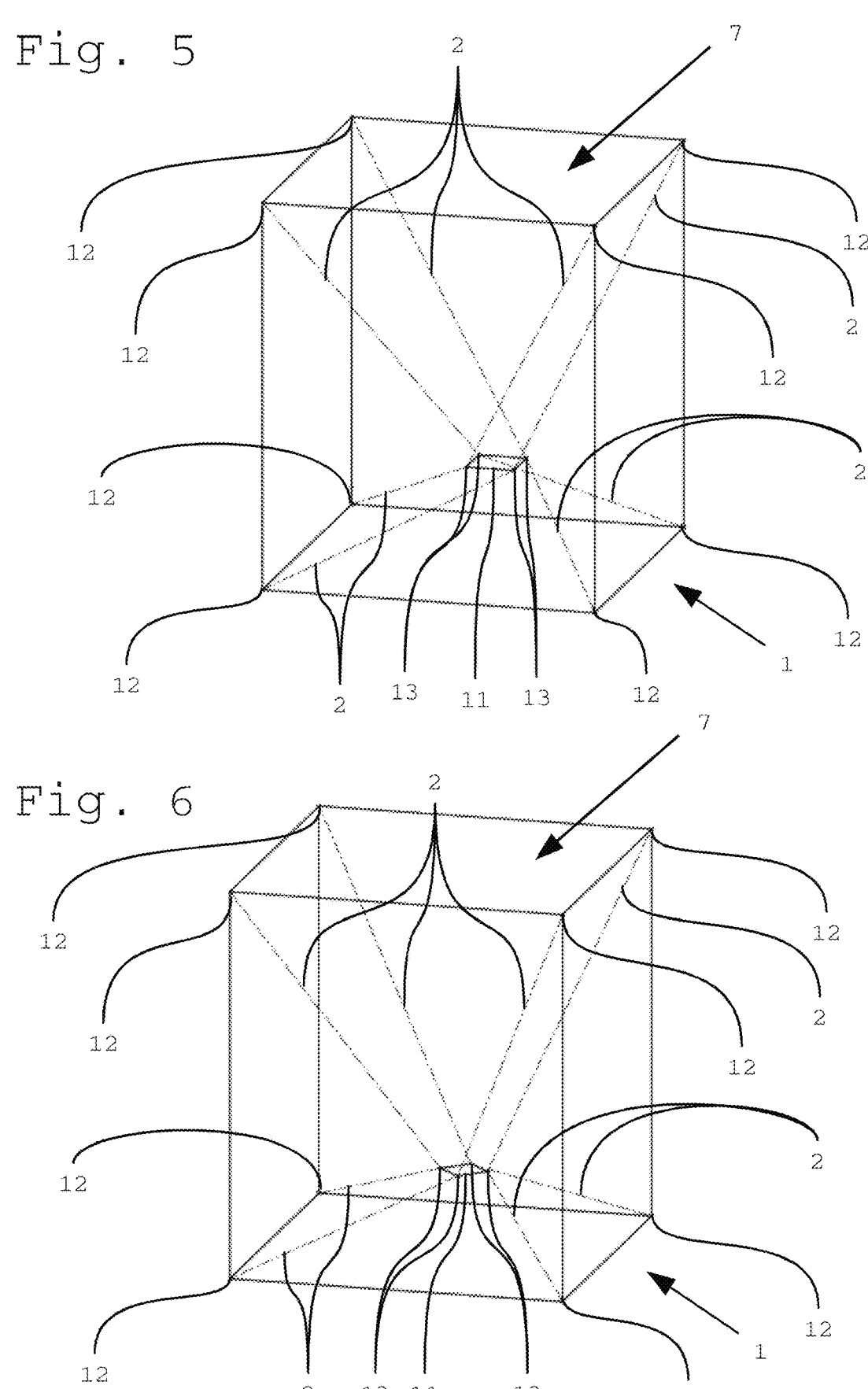

In FIG. 5, the cables 2 are guided from the diagonally opposite corners 12 in the working space 7 to one corner 13 each of the flat square frame.

In FIG. 6, the cables 2 are guided from the corners 12 diagonally opposite one side wall to the corner 13 of the flat square frame 11 facing this side wall.

Lateral inclinations of the flat frame 11 are only possible to a limited extent.

In FIGS. 7 to 12, the cables 2 are guided to a cuboid or cube-shaped frame 11.

Figure 7:
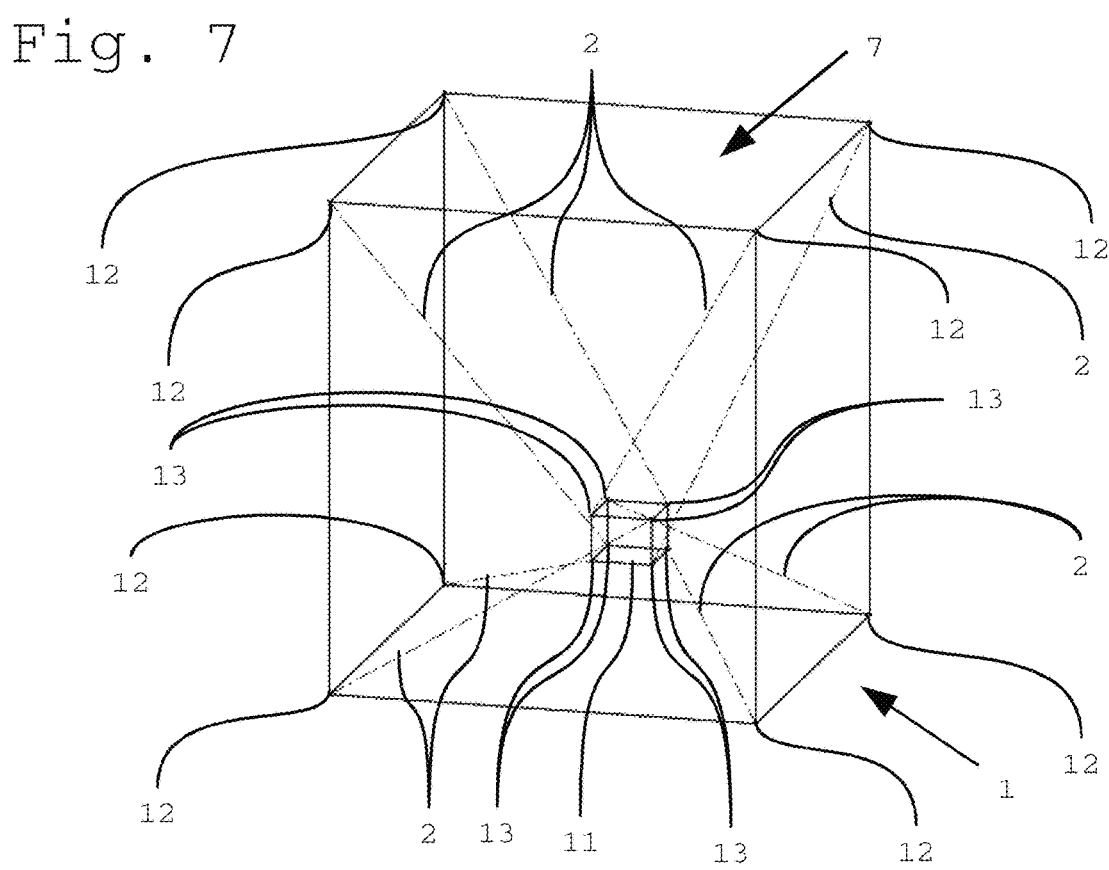

Thus, in FIG. 7, the cables 2 are each guided from the diagonally opposite corners 12 of a side wall, on the one hand, individually and crosswise to the corners 13 of the lower horizontal edge of the frame 11 facing this side wall and, on the other hand, individually not crosswise to the corners 13 of the upper horizontal edge of the frame 11 facing away from this side wall.

Figure 8:
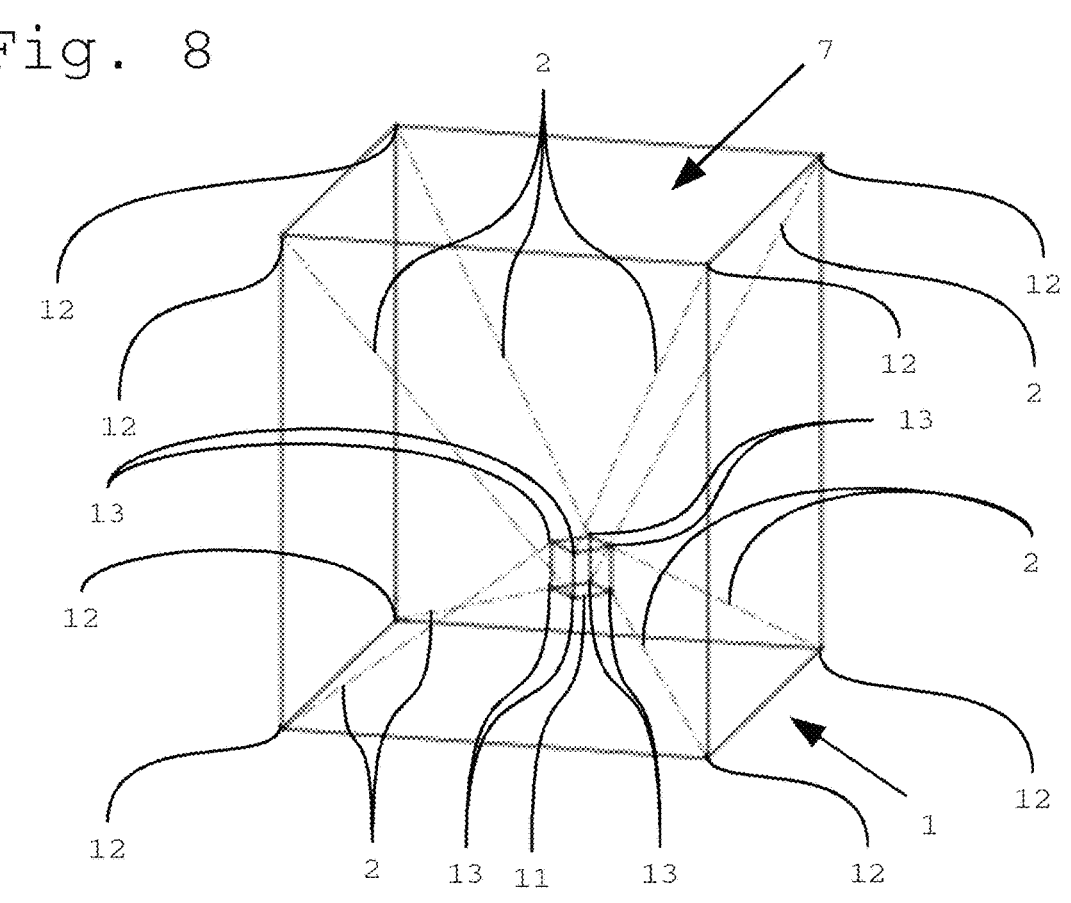

In FIG. 8, the cables 2 are each led individually from the adjacent corners 12 alternately from an upper and lower horizontal edge to the upper and lower corners 13 of a vertical edge of the frame 11 facing this side wall or edge.

Figures 9, 10:
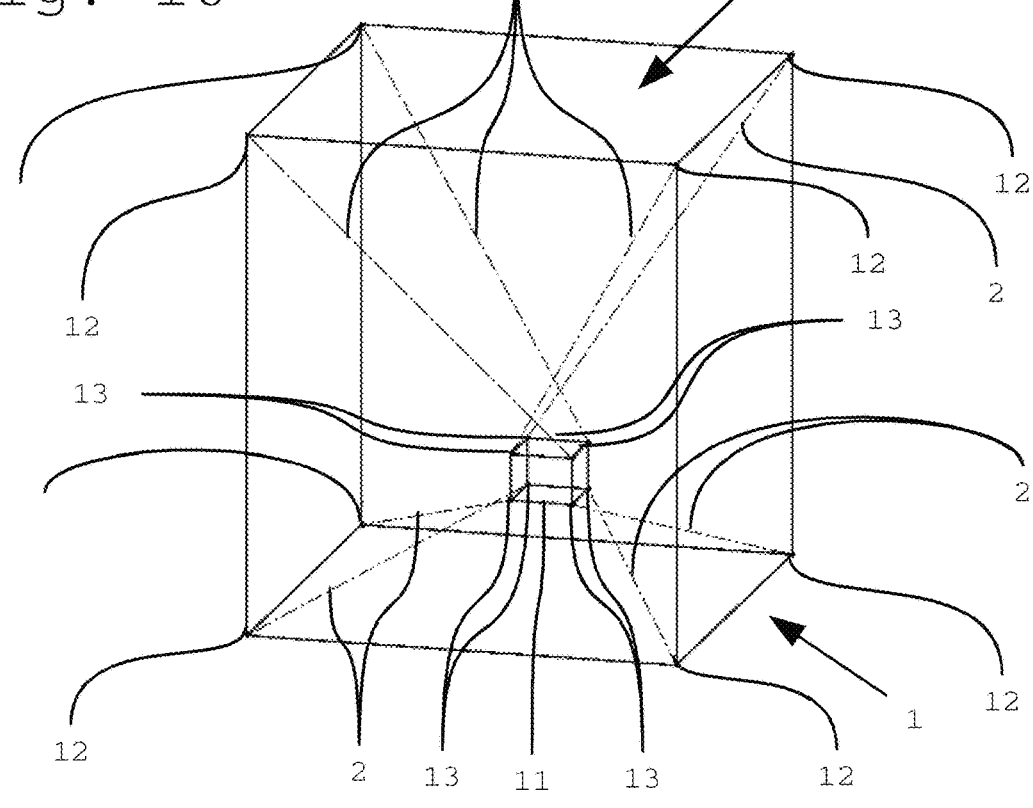

In FIG. 9, the cables 2 are, on the one hand, each individually guided from the adjacent corners 12 of mutually parallel upper and lower edges of the working space 7 to the corners 13 of mutually parallel lower and upper edges of the frame 11 parallel to the upper and lower edges of the working space 7, so that a cable 2 of an upper corner 12 of a vertical edge of the working space 7 is guided to a lower corner 13 of a vertical edge of the frame 11 and, conversely, a cable 2 of a lower corner 12 of the same vertical edge of the working space 7 is guided to an upper corner 13 of the same vertical edge of the frame 11.

Thus, in FIG. 10, the cables 2 are, on the one hand, each individually guided from the adjacent corners 12 of mutually parallel upper edges of the working space 7 to the corners 13, not lying crosswise opposite one another, of upper edges of the frame 11 parallel to one another and to the upper edges of the working space 7 and, on the other hand, each individually guided from the adjacent corners 12 of mutually parallel lower edges of the working space 7 crosswise to the corners 13 of lower edges of the frame 11 parallel to one another and to the lower edges of the working space 7.

In deviation from FIG. 10, in FIG. 11 the cables 2 are guided on the one hand individually from the adjacent corners 12 of mutually parallel upper edges of the working space 7 to the corners 13, not lying crosswise opposite each other, of mutually parallel upper edges of the frame 11 and to the upper edges of the working space 7, and on the other hand individually from the adjacent corners 12 of mutually parallel lower edges of the working space 7 likewise to the corners 13, not lying crosswise opposite each other, of mutually parallel lower edges of the frame 11 and to the lower edges of the working space 7.

In FIG. 12, the cables 2 are each guided individually from the corners 12 diagonally opposite one another on a side surface alternately to the upper and lower corners 13, facing this side wall or edge, of a vertical edge of the frame 11, so that the cable 2 is guided from a lower corner 12 of the respective side wall to the respective upper corner 13 of the vertical edge of the frame 11 and the cable 2 is guided from an upper corner 12 of the respective side wall diagonally opposite the lower corner 12 on the respective side wall to the respective lower corner 13 of the same vertical edge of the frame 11.

In FIGS. 13 to 15, the cables 2 are guided on a tetrahedron-shaped frame 11.

Thus, in FIG. 13, the cables 2 from two adjacent corners 12 of one of the horizontal edges of the working space 7 are jointly guided to a corner 13 of the tetrahedron-shaped frame 11, with the affected edges of the working space 7 at the bottom and at the top, respectively, being parallel and opposite to each other, but with the affected edges of the working space 7 at the top and offset from the affected edges of the working space 7 at the bottom by 90 degrees. In this regard, the tetrahedron-shaped frame 11 is arranged such that one of its edges at the top and one of its edges at the bottom are each arranged horizontally. The cables 2 from the corners 12 of the lower horizontal edges of the working space 7 are guided to the corners 13 of the upper horizontal edge of the tetrahedron-shaped frame 11, while the cables 2 from the corners 12 of the upper horizontal edges of the working space 7 are guided to the corners 13 of the lower horizontal edge of the tetrahedron-shaped frame 11.

In contrast, in FIG. 14, the cables 2 from two adjacent corners 12 of one of the horizontal edges of the working space 7 are jointly guided to a corner 13 of the tetrahedron-shaped frame 11, with the affected edges of the working space 7 at the bottom and at the top, respectively, being parallel and opposite to each other, but with the affected edges of the working space 7 at the top and offset from the affected edges of the working space 7 at the bottom by 90 degrees. In this regard, the tetrahedron-shaped frame 11 is arranged such that one of its edges at the top and one of its edges at the bottom are each arranged horizontally. The cables 2 from the corners 12 of the lower horizontal edges of the working space 7 are guided to the corners 13 of the lower horizontal edge of the tetrahedron-shaped frame 11, while the cables 2 from the corners 12 of the upper horizontal edges of the working space 7 are guided to the corners 13 of the upper horizontal edge of the tetrahedron-shaped frame 11.

In FIG. 15, the cables 2 are guided together from two adjacent corners 12 of one of the vertical edges of the working space 7 to a corner 13 of the tetrahedron-shaped frame 11. In this case, the upper cables 2 and the lower cables 2 of two vertical edges of a side wall of the working space 7 can cross each other in the course to the tetrahedron-shaped frame 11.

Figure 27:
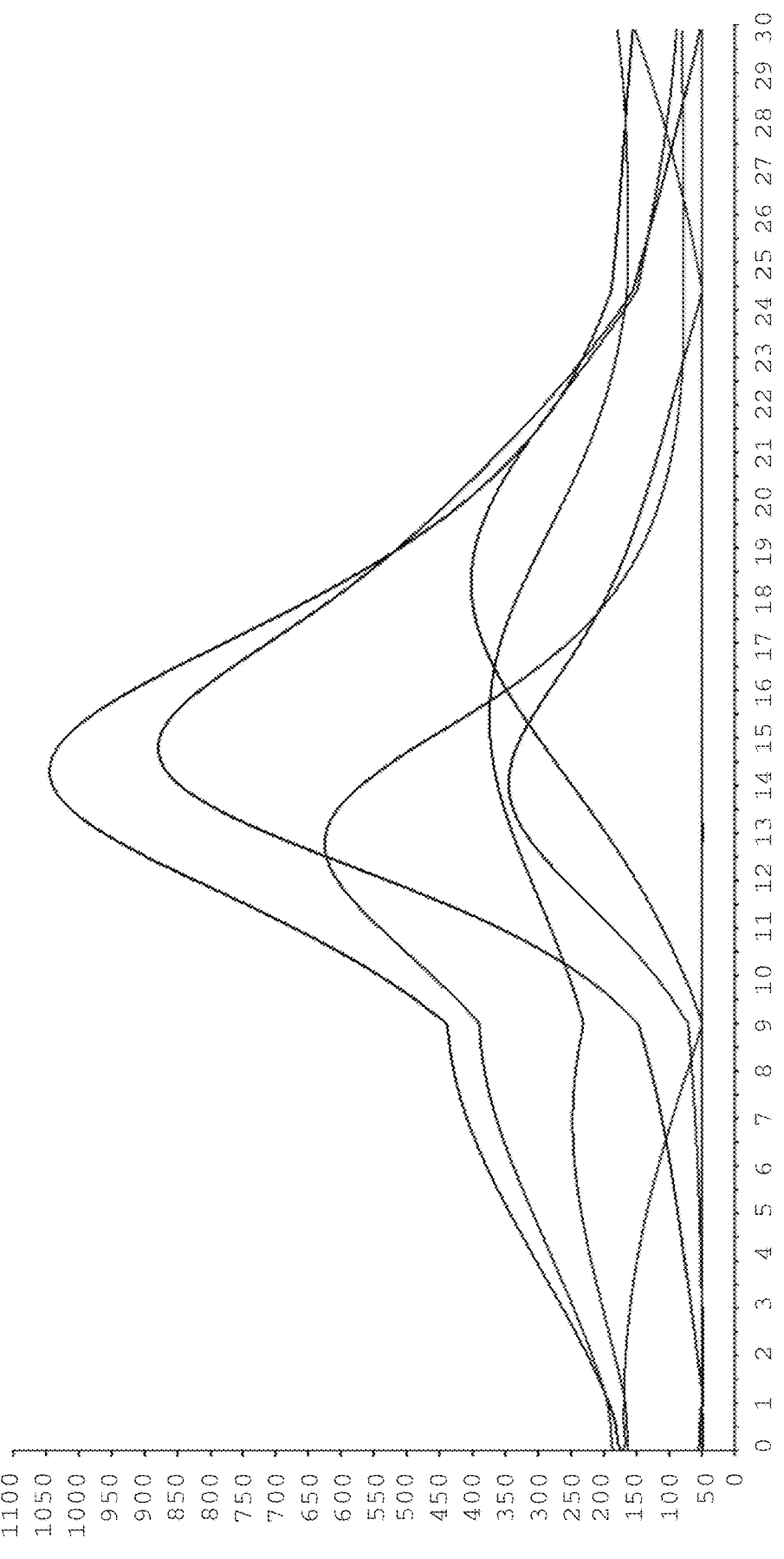

FIG. 27 shows the calculated theoretical cables forces of a curved track with a minimum pre-tensioning force of 20 Newton as a cable force curve. In the course of time at 9 and at 24.5 seconds a transition takes place, where one cable with minimum pre-tensioning force is replaced by another. This process takes place as soon as the third lowest cable force threatens to fall below the minimum pre-tensioning force and is caused by the change in the cable vectors due to the movement in a path curve of the print head in the working area or print area.

Figure 28:
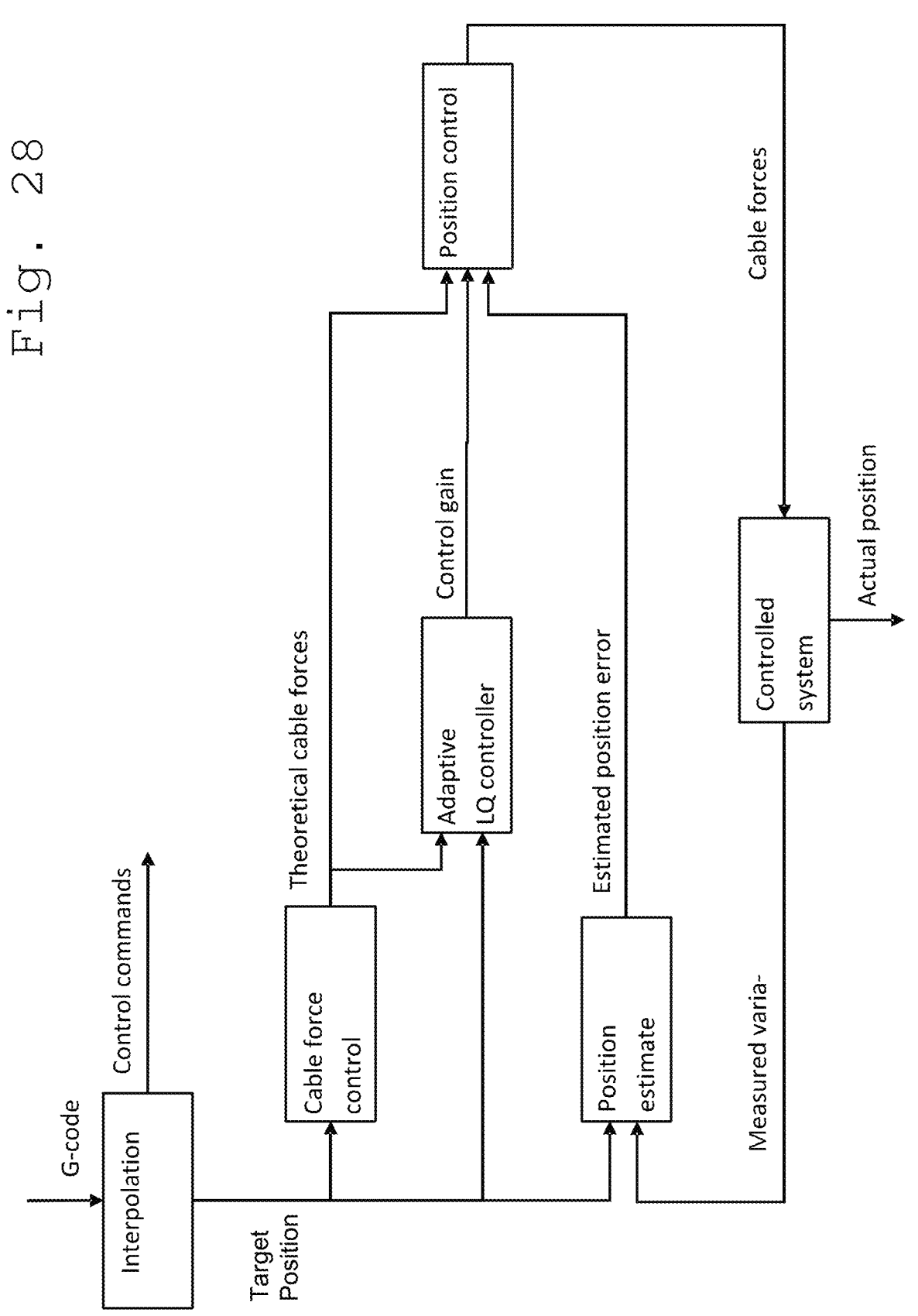
Figure 29:
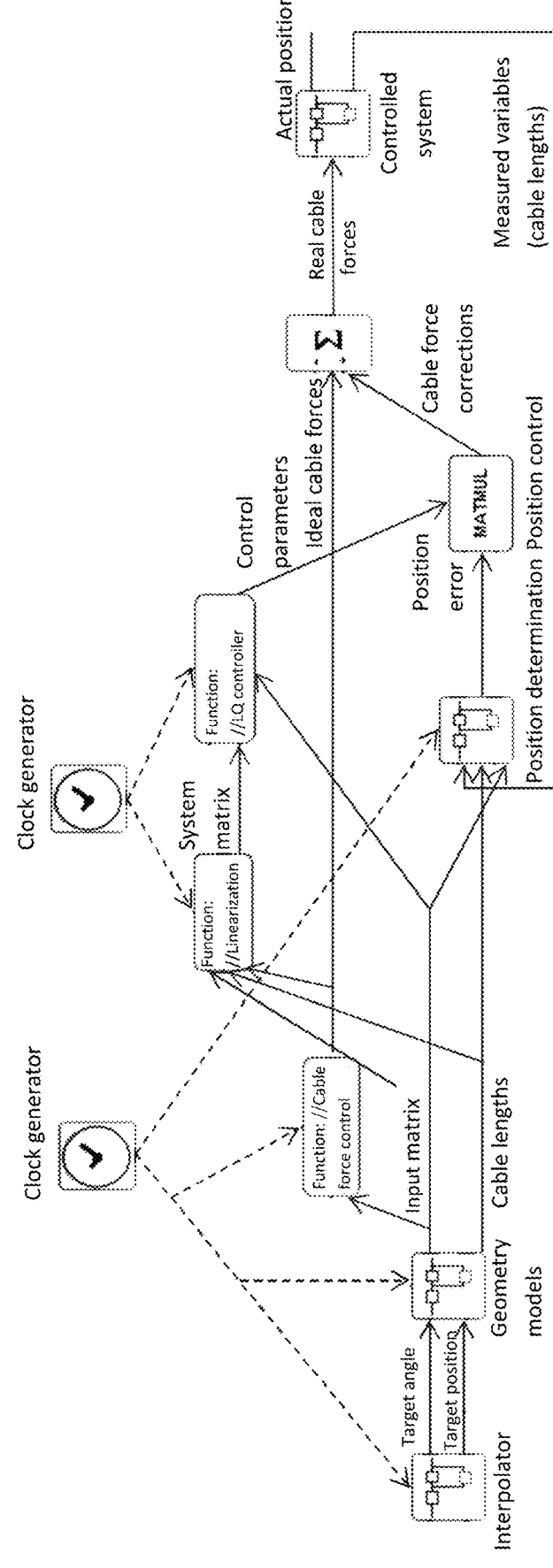

In FIG. 28 the block diagram for the control circuit of the cable robot 3D printer is presented. In FIG. 29 a block diagram for the overall scheme of the control loop is presented.

The geometry model is used to calculate the cable vectors from the end of the cable at the print head 4 to the cable drum 5 from the nominal position and angle of the print head 4, from which the cable lengths can be derived directly. Multiplying the normalized cable vectors by the cable forces gives the vectorial forces on the print head 4 generated by the cables 2, while the cross product of the cable end points with the cable forces gives the vectorial torques on the printhead 4 generated by the cables 2.

In the position determination, the position error of the print head 4 is determined from the measured variables. By linearizing the geometry relations by multiplying the transposed negative input matrix with the displacement of the print head 4 in all six degrees of freedom, that exactly the cable length difference results. An inversion of this equation allows the position error to be determined from the product of the negative transposed pseudo inverse of the input matrix and the measurement errors. By including the Moore-Penrose pseudoinverse, the algorithm returns the position that most accurately matches the measured cable lengths.

LIST OF REFERENCE NUMERALS

1—Cable robot 3D printer, cable robot
2—Cable, strap
3—First end of the cable or strap
4—Print head
5—Cable drum
6—Second end of the cable or strap
7—Workroom
8—Drive
9—Material feed
10—Nozzle
11—Frame
12—Corner
13—Corner
14—External toothing
15—Worm shaft
16—Gripper
17—Coupling
18—Seal
19—Cable attachment or strap attachment to the print head
20—Roller side disc
21—Holder
22—Helical screw

The invention claimed is:

1. A cable robot 3D printer (1), comprising a cable robot (1) with eight cables (2) or straps (2), wherein the cables (2) or straps (2) are detachably attached at a first end (3) to a print head (4) and are guided from the print head (4) to a respective cable drum (5), characterized in that another second end (6) of the cables (2) or straps (2), which is opposite the print head (4) in each case, windable in the cable drum (5) in an axial planar, meaning only perpendicular to the rotation axis of the cable drum, and crossing-free manner with more than one winding in an axial planar only, wherein the cable drum (5) has an external toothing (14) and the external toothing (14) of the cable drum (5) engages in a worm shaft (15), the drive (8) directly or indirectly driving the worm shaft (15), wherein a helical worm (22) of the worm shaft (15) engage in external teeth (14) of pulley side discs (20) of the cable drum (5) and the cable drum (5) is pivoted about the worm shaft (15) and wherein the cable drums (5) are arranged within a working space (7) and wherein the cable drums (5) are drivable and the drives (8) of the cable drums (5) are arranged outside or inside the working space (7), and in that at least one material feed (9) and at least one nozzle (10) are provided on the print head (4) and that the respective cable drum (5) is in two parts.

2. The cable robot 3D printer according to claim 1, characterized in that the working space (7) is separable or closable or sterile.

3. The cable robot 3D printer according to claim 1, characterized in that the working space (7) is cube-shaped or cuboid-shaped.

4. The cable robot 3D printer according to claim 1, characterized in that the cable drums (5) are arranged in the area of the corners (12) of the cube-shaped or cuboid working space (7).

5. The cable robot 3D printer according to claim 1, characterized in that the print head (4) is arranged on or in a square or rectangular or round frame (11), a cube-shaped frame (11) or transverse-wire-shaped frame (11) or a tetrahedron-shaped frame (11), and the first end (3) of the respective cables (2) or bands (2) are attached to the frame (11) in a floating or movable manner.

6. The cable robot 3D printer according to claim 1, characterized in that the print head (4), or components of the print head (4), are configured to rotate in one of two or more axes.

7. The cable robot 3D printer according to claim 1, characterized in that a cable (2) or strap (2) is guided from the respective cable drums (5) at the top and bottom in each case individually or in pairs to a corner (13) of a frame (11) and/or in that the cables (2) or straps (2) are guided from corners (12), in each case adjacent to the cable drums (5), of a side surface bounding the working space or of an edge at the bottom or top, from the corners (12) diagonally opposite one of the side surfaces bounding the working space (7), and/or from the corners (12) diagonally opposite one another in the working space (7) are each guided individually or in pairs to a corner (13) of the frame (11) or print head (4) and/or each guided individually or in pairs to adjacent or diagonally opposite corners (13) of the frame (11) or print head (4).

8. The cable robot 3D printer according to claim 1, characterized in that the worm shaft (15) is guided via a seal from the working space (7) to the drive (8) or is coupled or operatively connected to the drive (8) by means of a coupling (17), or in that the drive (8) is arranged inside the working space (7) and is coupled or operatively connected to the worm shaft (15).

9. The cable robot 3D printer according to claim 1, characterized in that
the print head (4) comprises at least one gripping device (16).

\* \* \* \* \*